US 7,240,940 B2

(12) United States Patent
Leitner

(10) Patent No.: US 7,240,940 B2
(45) Date of Patent: Jul. 10, 2007

(54) VEHICLE CARGO BED EXTENDER

(75) Inventor: Horst Leitner, Laguna Beach, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 11/105,120

(22) Filed: Apr. 13, 2005

(65) Prior Publication Data

US 2006/0061114 A1    Mar. 23, 2006

Related U.S. Application Data

(60) Provisional application No. 60/612,544, filed on Sep. 23, 2004.

(51) Int. Cl.
*B62D 33/02* (2006.01)
(52) U.S. Cl. .................................. 296/26.11
(58) Field of Classification Search .. 296/26.08–26.11, 296/52; 292/DIG. 29, DIG. 30, DIG. 42, 292/DIG. 43
See application file for complete search history.

(56) References Cited

U.S. PATENT DOCUMENTS

| 1,242,035 | A | 10/1917 | Pierson et al. |
|---|---|---|---|
| 1,266,521 | A | 5/1918 | Norquist |
| 1,272,620 | A | 7/1918 | Carlson |
| 1,289,997 | A | 12/1918 | Wyeth |
| 1,655,777 | A | 1/1928 | Weiland |
| 1,655,797 | A | 1/1928 | Peck |
| 1,764,615 | A | 6/1930 | Edwards |
| D160,213 | S | 9/1950 | Samuelson |
| 2,621,357 | A | 12/1952 | Stuman |
| 2,626,179 | A | 1/1953 | Gonzalez |
| 2,720,414 | A | 10/1955 | Hart |
| 2,795,363 | A | 6/1957 | Turner |
| 3,902,599 | A | 9/1975 | Stromberg |
| 4,023,850 | A | 5/1977 | Tillery |
| 4,136,905 | A | 1/1979 | Morgan |
| 4,419,794 | A | 12/1983 | Horton, Jr. et al. |
| 4,451,075 | A | 5/1984 | Canfield |
| 4,470,716 | A | 9/1984 | Welch |
| 4,472,639 | A | 9/1984 | Bianchi |
| 4,531,773 | A | 7/1985 | Smith |
| 4,596,417 | A | 6/1986 | Bennett |
| 4,635,992 | A | 1/1987 | Hamilton et al. |
| 4,652,035 | A | 3/1987 | Austin, Jr. |
| D291,789 | S | 9/1987 | Noga |
| 4,749,226 | A | 6/1988 | Heft |
| 4,750,773 | A | 6/1988 | Chapline et al. |
| 4,778,213 | A | 10/1988 | Palmer |

(Continued)

*Primary Examiner*—Dennis H. Pedder
(74) *Attorney, Agent, or Firm*—Knobbe Martens Olson & Bear, LLP

(57) ABSTRACT

A vehicle bed extender particularly adapted for ease of installation and removal. The extender includes a first side wall, a second side wall, a connecting wall, a first mount, a second mount, a first mounting station, and a second mounting station. The connecting wall, the first side wall, and the second side wall cooperate to form a generally U-shaped frame. The first mounting station and the second mounting station each comprise a stationary portion and a moveable portion configured such that the moveable portion, in a first position, cooperates with the stationary portion to engage the first mount or the second mount and to prevent disengagement. The moveable portion of the first mounting station and the second mounting station can be moved by a manual application of pressure to a second position which allows such disengagement.

20 Claims, 27 Drawing Sheets

U.S. PATENT DOCUMENTS

| | | | | |
|---|---|---|---|---|
| 4,786,119 | A | 11/1988 | Smuda | |
| D300,734 | S | 4/1989 | Kruitbosch | |
| 4,824,158 | A | 4/1989 | Peters et al. | |
| 4,828,312 | A | 5/1989 | Kinkel et al. | |
| 4,830,242 | A | 5/1989 | Painter | |
| 4,875,724 | A * | 10/1989 | Gruber | 292/216 |
| 5,024,409 | A | 6/1991 | Bohnen | |
| 5,037,153 | A | 8/1991 | Stark | |
| 5,083,829 | A | 1/1992 | Fonseca | |
| D326,076 | S | 5/1992 | Wiese | |
| 5,114,203 | A | 5/1992 | Carnes | |
| 5,123,691 | A | 6/1992 | Ginn | |
| 5,147,103 | A | 9/1992 | Ducote | |
| 5,154,470 | A | 10/1992 | Bringman, Jr. | |
| 5,169,200 | A | 12/1992 | Pugh | |
| 5,201,562 | A | 4/1993 | Dorsey | |
| 5,253,913 | A | 10/1993 | Metivier | |
| 5,468,038 | A | 11/1995 | Sauri | |
| D365,323 | S | 12/1995 | Napierkowski et al. | |
| 5,622,296 | A | 4/1997 | Pirhonen | |
| 5,658,033 | A | 8/1997 | Delaune | |
| 5,700,047 | A | 12/1997 | Leitner et al. | |
| 5,730,342 | A | 3/1998 | Tien | |
| 5,743,589 | A | 4/1998 | Felker | |
| 5,752,800 | A | 5/1998 | Brincks et al. | |
| 5,755,480 | A | 5/1998 | Bryan | |
| 5,765,892 | A | 6/1998 | Covington | |
| 5,775,759 | A | 7/1998 | Cummins | |
| 5,806,907 | A | 9/1998 | Martinus et al. | |
| 5,820,188 | A | 10/1998 | Nash | |
| 5,853,116 | A | 12/1998 | Schreiner | |
| 5,857,724 | A | 1/1999 | Jarman | |
| 5,911,464 | A * | 6/1999 | White | 296/26.11 |
| D417,859 | S | 12/1999 | Leitner et al. | |
| D418,106 | S | 12/1999 | Leitner et al. | |
| 6,113,173 | A | 9/2000 | Leitner et al. | |
| 6,402,215 | B1 | 6/2002 | Leitner et al. | |
| 6,805,392 | B2 | 10/2004 | Leitner et al. | |
| 7,121,604 | B2 * | 10/2006 | Reed | 296/26.11 |

* cited by examiner

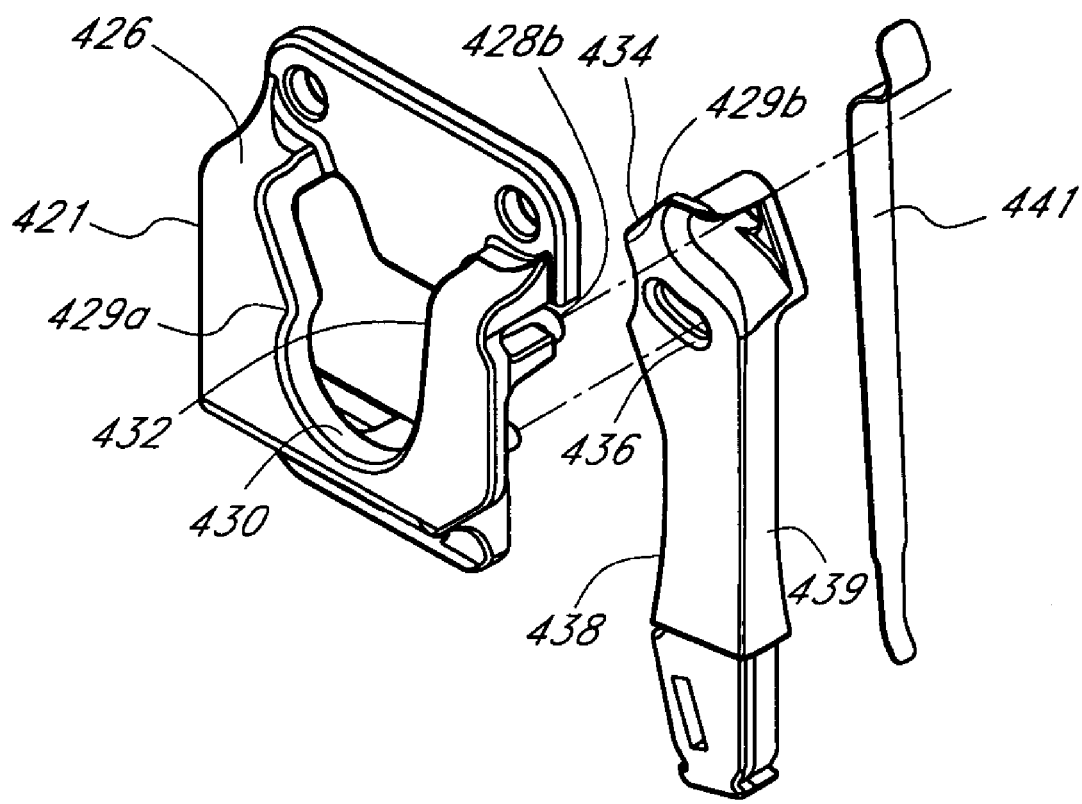
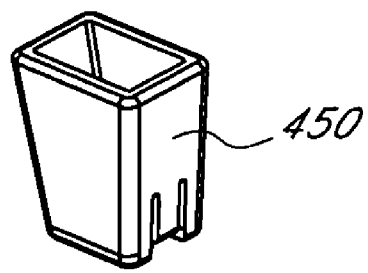
FIG. 17B

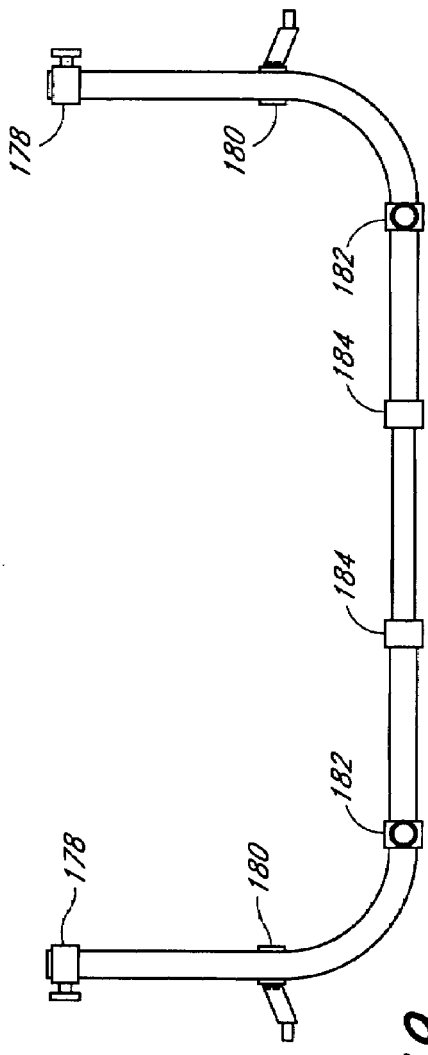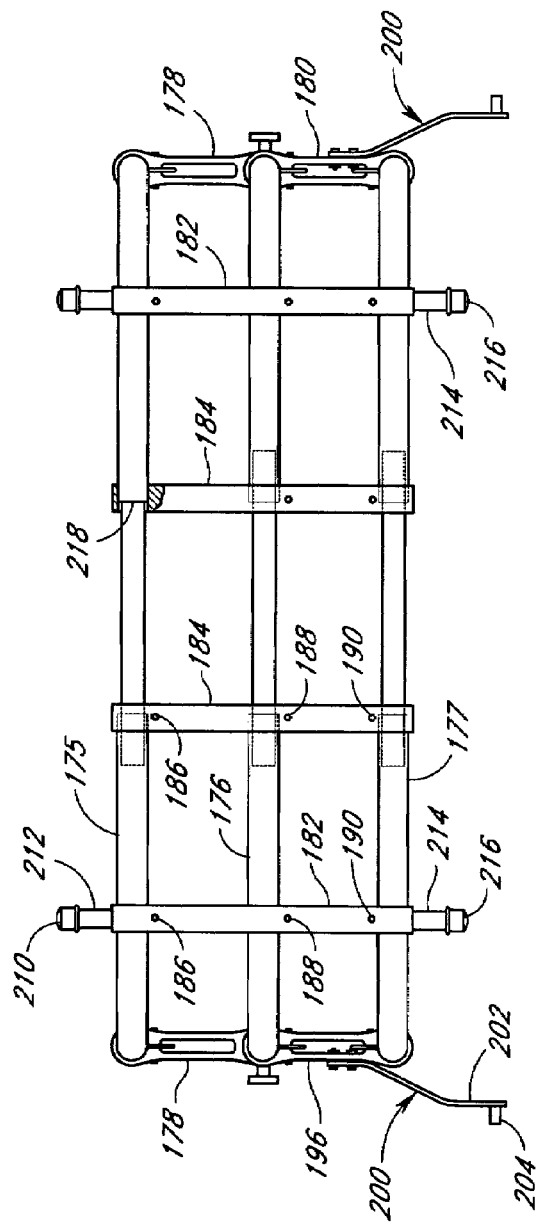

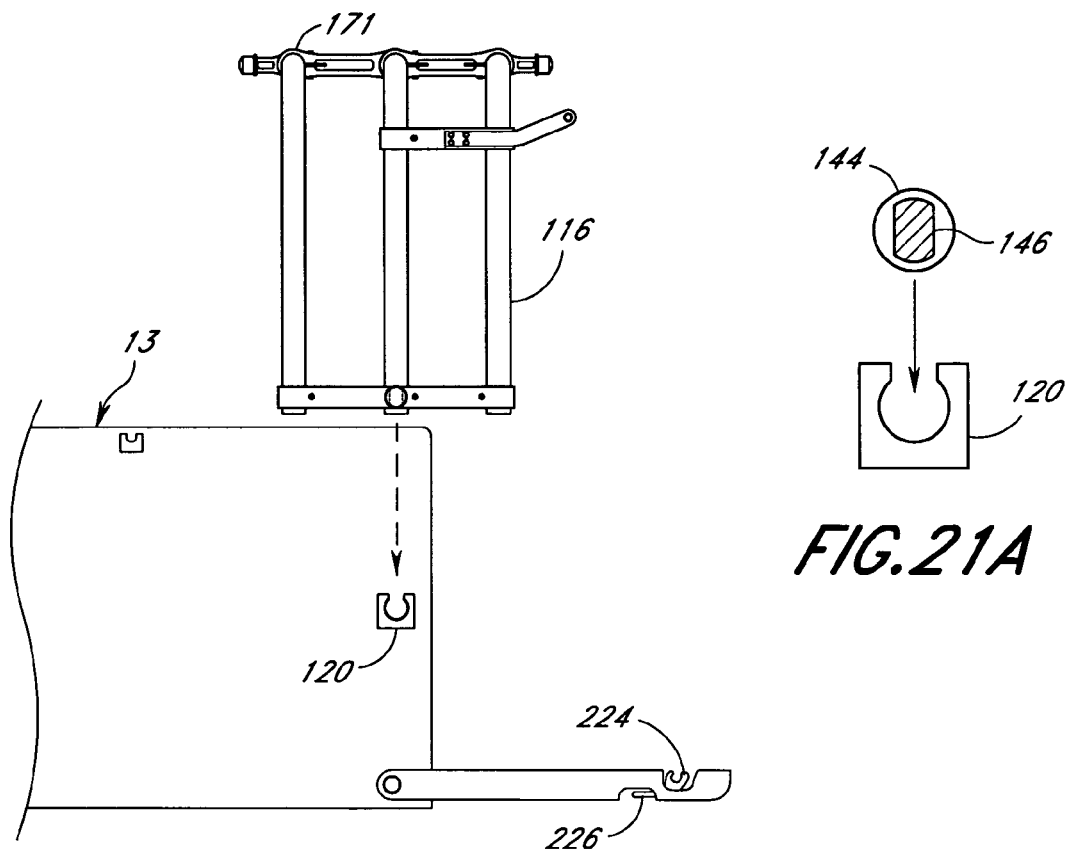
FIG.21
FIG.21A
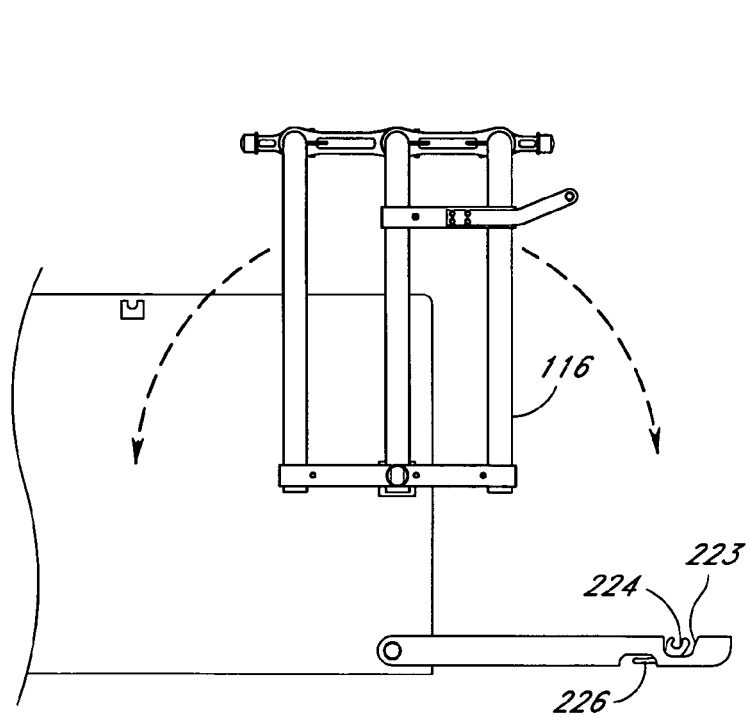
FIG.22
FIG.22A

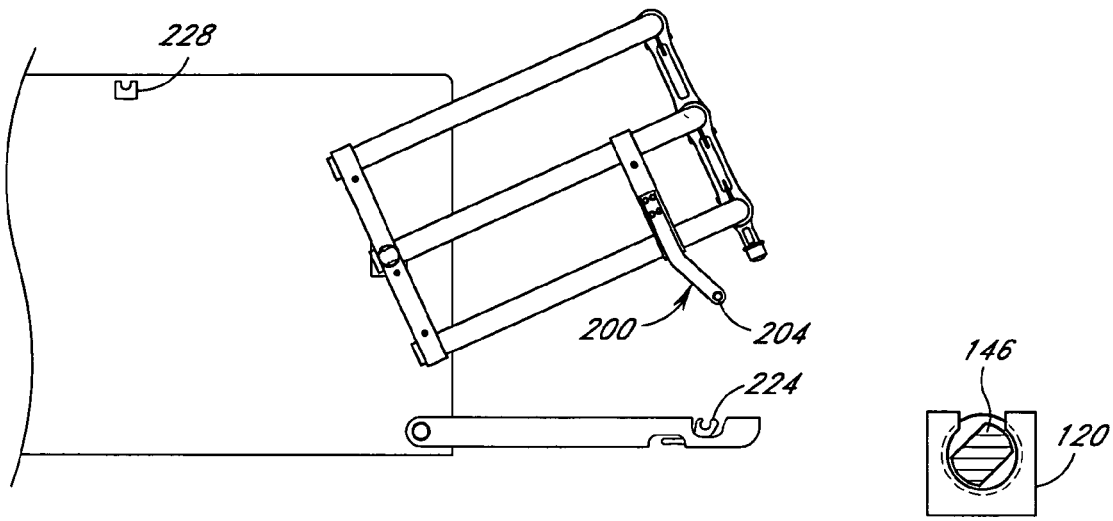
FIG.23
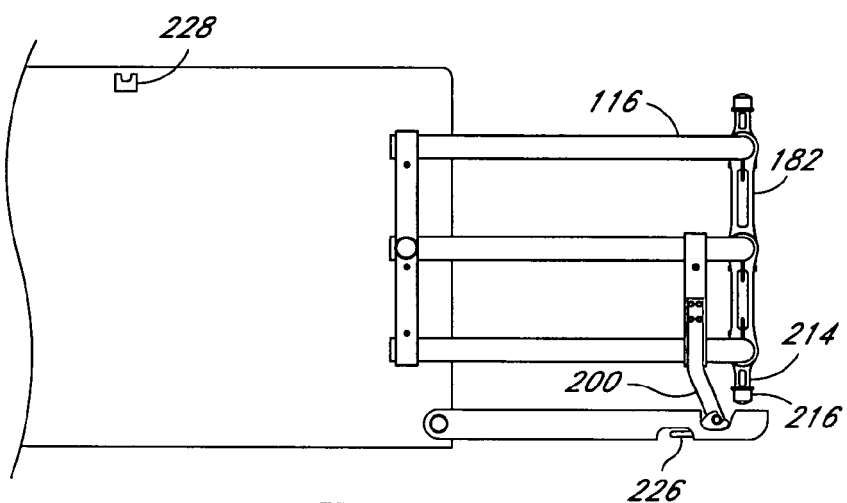
FIG.24
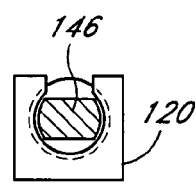
FIG.23A
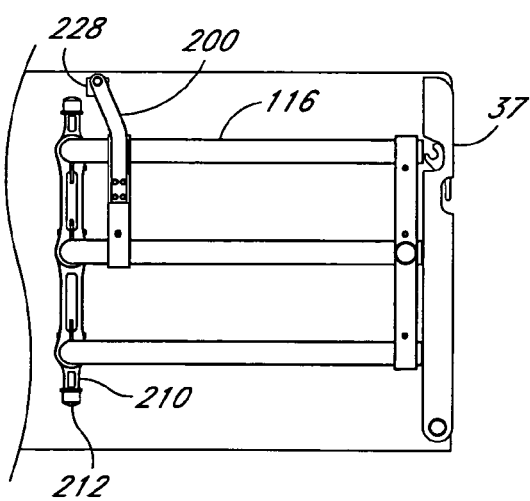
FIG.25
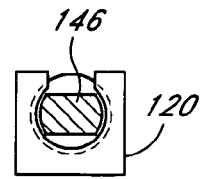
FIG.24A
FIG.25A

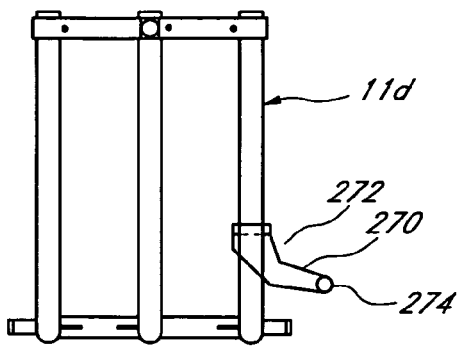
FIG.28
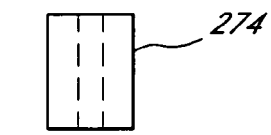
FIG.32
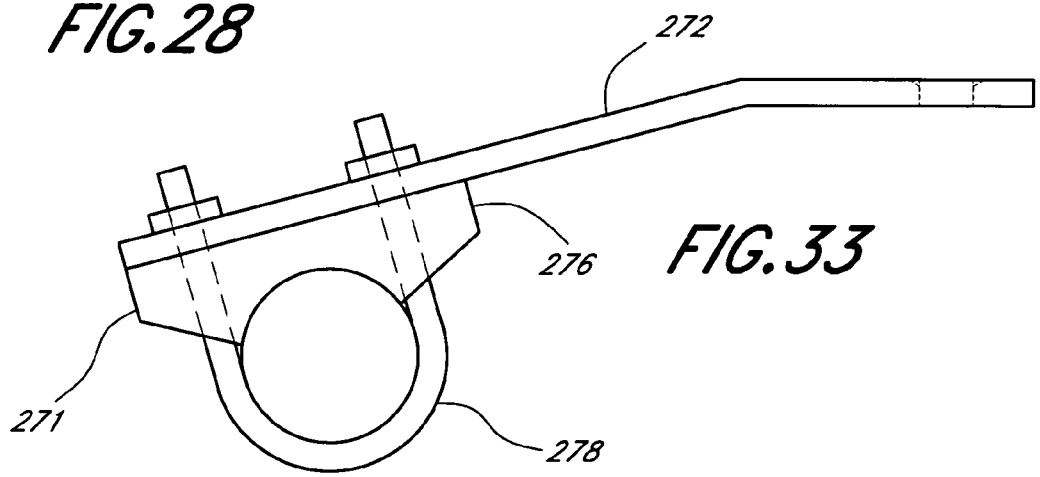
FIG.33
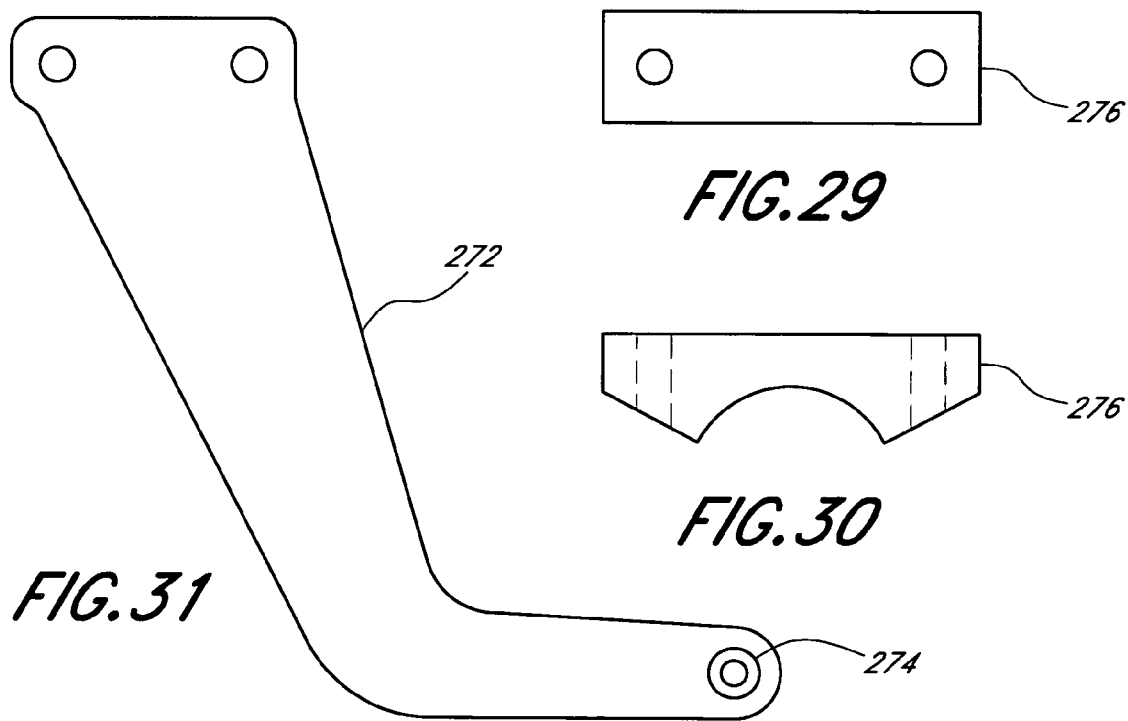
FIG.29
FIG.31
FIG.30

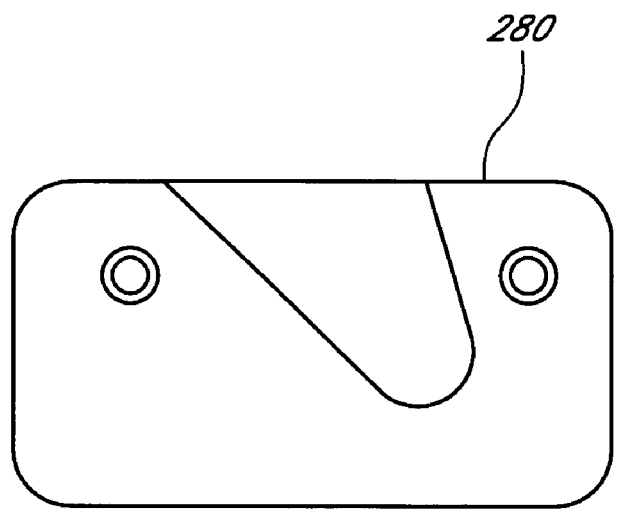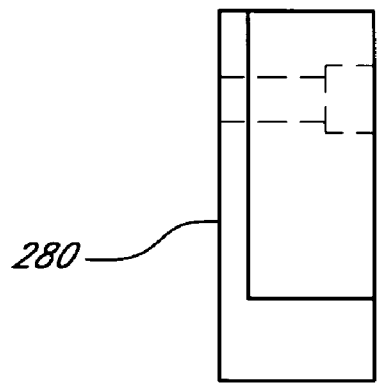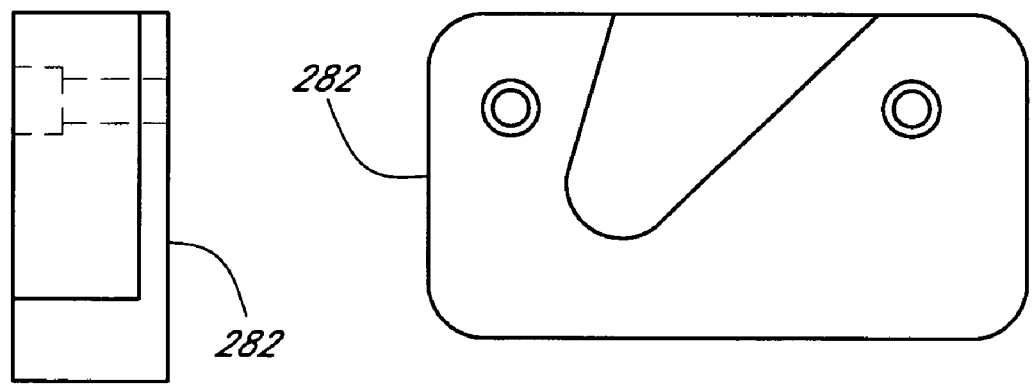
FIG.34
FIG.35
FIG.36
FIG.37

VEHICLE CARGO BED EXTENDER

REFERENCE TO RELATED APPLICATIONS

This application claims priority to U.S. Provisional Patent Application No. 60/612,544, which was filed Sep. 23, 2004 and is entitled "VEHICLE CARGO BED EXTENDER." The foregoing provisional patent application is hereby incorporated by reference in its entirety into this application.

This application is also related to but does not claim priority to the following United States Patent Applications: U.S. patent application Ser. No. 10/914,384, filed Aug. 9, 2004, which is pending, which is a continuation of U.S. patent application Ser. No. 10/171,456, filed Jun. 11, 2002, which issued as U.S. Pat. No. 6,805,392, which is a continuation of prior U.S. patent application Ser. No. 09/524,332, filed Mar. 13, 2000, which issued as U.S. Pat. No. 6,402,215, which is a continuation of prior U.S. patent application Ser. No. 09/347,472, filed Jul. 2, 1999 and abandoned, which claims the benefit of prior U.S. Provisional Patent Application No. 60/091,623, filed Jul. 2, 1998, and is a continuation-in-part of prior U.S. patent application Ser. No. 09/022,951, filed Feb. 12, 1998 and abandoned, which claims the benefit of prior U.S. Provisional Patent Application No. 60/063,784, filed Oct. 31, 1997, and is a continuation-in-part of prior U.S. patent application Ser. No. 08/924,230, filed Sep. 5, 1997, which issued as U.S. Pat. No. 6,113,173 and which is a continuation of prior U.S. patent application Ser. No. 08/651,921, filed on May 21, 1996, which issued as U.S. Pat. No. 5,700,047. All of the foregoing applications are incorporated by reference in their entirety into this application.

BACKGROUND OF THE INVENTION

1. Field of the Invention

Embodiments of the invention relate to an improved truck bed extender and, in particular, to a truck bed extender particularly adapted for ease of installation and removal.

2. Description of the Related Art

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to adequately transferred. Unfortunately, this raises the risk that the load will fall out of the back of the truck, or that the load will need to be tied down, taking additional time.

For this reason, various truck bed extenders have been developed. These extenders are typically mounted to the truck bed by brackets or hinges. Truck bed extenders often comprise a series of light weight panels designed to be foldable to minimize their impact on storage space when not in use, as is shown in U.S. Pat. No. 4,472,639 to Bianchi. Alternatively, the truck bed extenders may comprise strong, but relatively heavy and nonfoldable units, such as disclosed in U.S. Pat. No. 4,778,213 to Palmer. Palmer discloses extended side supports secured to the tailgate by brackets or welding and a supplemental tailgate. When the main tailgate is closed, the supplemental tailgate extends over the top of the vehicle's storage bed. It is disclosed that a flexible netting may be secured to the right and left supports so that the netting extends in a vertical plane to form a storage box.

There remains, however, a need for an improved truck bed extender.

SUMMARY OF THE INVENTION

In a preferred embodiment, there is provided an improved truck bed extender which is particularly adapted for ease of installation and removal. When not being used to extend the truck bed, the extender is advantageously adapted to quickly and easily create a secondary storage area. Another aspect of the invention is a method for utilizing a truck bed extender.

In one embodiment, there is provided a truck bed extender for use with a vehicle having an open storage bed having a rear end, a first upstanding side panel to one side of the bed, a second upstanding side panel to an opposite side of the bed, and a tailgate, wherein the first upstanding panel defines a first mounting station and the second upstanding panel defines a second mounting station. The extender has a first side wall, a second side wall, a connecting wall, a first mount and a second mounting mount. The connecting wall extends between the first side wall and the second side wall, and cooperates with the first side wall and second side wall to form a generally U-shaped frame. The first mount is secured to the first side wall and includes a first interlocking member. The second mount is secured to the second side wall and comprising a second interlocking member. The first interlocking member and the first mounting station and the second interlocking member and the second mounting station cooperate to secure the truck bed extender to the vehicle so that the extender is rotatable about an axis between a first position and a second position. In the first position, the connecting wall is in an upright position over the tailgate rearward of the rear end of the bed. In the second position, the connecting wall is in an upright position spaced forward from the rear end of the bed and the tailgate.

Advantageously, the first mounting station comprises a first aperture and the second mounting station comprises a second aperture and the first interlocking member is a retractable male member sized and shaped to be received and retained within the first aperture and the second interlocking member is a retractable male member sized and shaped to be received and retained within the second aperture. An important aspect of the invention is that the connecting wall desirably comprises at least two interconnecting sections which are slidable relative one another permitting the horizontal span of the connecting wall to be adjusted to correspond to the particular width of the truck bed. Effective truck bed widths can vary between manufacturers and vary depending on whether a truck bed protector has been installed. Advantageously, the extender's adjustability desirably permits the identical extender to be used with most truck beds, at least in a given size classification.

The extender may also comprise a first L-shaped section defining the first side wall and a first portion of the connecting wall and a second L-shaped section defining the second side wall and a second portion of the connecting wall. Advantageously, these L-shaped portions significantly increase the strength and rigidity of the extender, enhancing its ability to withstand bumping by heavy cargo, such as motorcycles, as well as external impact.

In one embodiment, there is provided at least one buckle secured to one of the walls sized and shaped to be releasably locked to the latch of the vehicle tailgate. Significantly, the buckle provides a supplemental attachment point which minimizes movement and vibration of the extender while driving and is quickly releasable by using the vehicle tailgate's own opening mechanism.

In one embodiment, there is provided a truck bed extender for use with a vehicle having a storage bed. The extender includes a first side wall, a second side wall, a connecting wall, a first mount and a second mount. The connecting wall extends between the first wall and the second wall and cooperates with the first wall and second wall to form a general U-shaped frame. The first mount is secured to the first side wall and includes a first interlocking member. The second mount is secured to the second wall and includes a second interlocking member. The extender is securable to the vehicle through cooperation of the first interlocking member and the first mounting station and the second interlocking member and the second mounting station in a first position wherein the connecting wall is in an upright position over the tailgate rearward of the rear end of the storage bed and a second position wherein the connecting wall is in an upright position spaced forward from the rear end of the bed and the tailgate.

In one embodiment, there is provided a truck bed extender for use with a vehicle having a first side panel defining a first forward mounting station and a first rearward mounting station, and a second panel defining a second forward mounting station and a second rearward mounting station, wherein the extender includes a first side wall, a second side wall, a connecting wall, a first mount and a second mount. The connecting wall extends between the first side wall and the second side wall, and cooperates with the first side wall and the second side wall to form a generally U-shaped frame. The first mount is secured to the first side wall and includes a first interlocking member. The second mount is secured to the second side wall and comprises a second interlocking member. The extender is securable to the vehicle through cooperation of: (1) the first interlocking member and the first forward station and the second interlocking member and the second forward station in a first position wherein the first side wall and the second side wall extend forward of the connecting wall and the connecting wall is in an upright position spaced rearward from the front panel, and (2) the first interlocking member and the first rearward station, and the second interlocking member and the second rearward station in a second position wherein the connecting wall is in an upright position spaced rearward from the rear end of the bed over the tailgate.

Desirably, the extender is also securable to the vehicle through cooperation of the first interlocking member and the first rearward station and the second interlocking member and the second rearward station in a third position, wherein the connecting wall is in an upright position spaced forward from the rear end of the bed and the tailgate.

As will be readily apparent to one of skill in the art, with respect to certain embodiments a method is described for mounting a truck bed extender on a vehicle.

In one embodiment, there is provided a truck bed extender for use with a vehicle having an open storage bed having a rear end, a first upstanding side panel to one side of the bed having an inner side, a second upstanding side panel to the opposite side of the bed having an inner side, and a tailgate. A first mounting station fixed with respect to the first upstanding panel defines a first station surface and a second mounting station fixed with respect to a second upstanding panel defines a second station surface. The bed extender comprises a first sidewall, a second sidewall, a connecting wall, a first mount and a second mount. The connecting wall extends between the first sidewall and the second sidewall. The first sidewall, the second sidewall and the connecting wall cooperate to form generally u-shape frame having a first open side and a second open side. The first mount is on the first sidewall and comprises a first interlocking member defining a first mount surface. The second mount is on the second sidewall and comprises a second interlocking member defining a second mount surface. The first station surface and the first mount surface, and the second station surface and the first mount surface cooperate to secure the apparatus to the vehicle so that the apparatus is in an upright position over the tailgate rearward of the rear end of the bed with the first open side facing away from the tailgate and the second open side facing toward the tailgate. One of the first station surface and the first mount surface defines a first opening through which the other of the first station surface and the first mount surface can be manually withdrawn from the inner side of the first panel to disengage the extender from the first panel. One of the second station surface and the second mount surface defines the second opening through which the other of the second station surface and the second mount surface can be manually withdrawn from the inner side of the second panel to disengage the extender from the second panel.

Desirably, the extender is rotatable about an axis between a first position wherein the connecting wall is in a substantially vertical position over the tailgate rearward of the rear end of the bed and the first mount cooperates with the first station and the second mount cooperates with the second station to secure the assembly against movement radial to the axis, and a second position wherein the connecting wall is in a nonvertical position and the first mount cooperates with the first station and the second mount cooperates with the second station to permit the assembly to be moved full radially with respect to the axis.

According to one embodiment, a method is described for an individual to mount a vehicle bed extender on a vehicle without tools including: aligning a first mount fixed with respect to the extender with a first space defined by the first station and aligning a second mount fixed with respect to the extender with a second space defined by the second station; moving the bed extender such that the first mount moves radially through the first space with respect to an axis defined by the first station and the second station and the second mount moves radially with respect to the axis through the second space; and pivoting the extender about the axis so that the first mount cooperates with the first station and the second mount cooperates with the second station to prevent radial movement of the first mount with respect to the axis and the second mount with respect to the axis.

According to one embodiment, a method is described for an individual to mount a vehicle bed extender on a vehicle without tools, including: grasping the bed extender in the first location with one hand; grasping the bed extender in a second location spaced from the first location with another hand; while continuing to grasp the extender with the first hand and the second hand, aligning the first mount with a first space defined by the first station and aligning a second mount with a second space defined by the second station; and while continuing to grasp the extender with the first hand and the second hand, moving the bed extender such that the first mount moves through the first space defined by the first station and the second mount moves through the second space defined by the second station.

In one embodiment, there is provided a truck bed extender for use with a vehicle having an open storage bed having a rear end, a first standing side panel to one side of the bed, a second upstanding side panel to an opposite side of the bed and a tailgate, a first mounting station fixed with respect to the first upstanding panel defining a first station surface and a second mounting station fixed with respect to the second upstanding panel defining a second station surface. The extender includes a first sidewall, a second sidewall, a connecting wall extending between the first sidewall and the second sidewall, a first mount secured to the first sidewall, and a second mount secured to the second sidewall. The first sidewall of the second sidewall and the connecting wall cooperate to form a generally U-shaped frame. The first mount defines a first mount surface and the second mount defines a second mount surface. The first station surface and the first mount surface, and the second station surface and the first mount surface cooperate to secure the apparatus to the vehicle so that the connecting wall is in an upright position over the tailgate rearward of the rear end of the bed. The tailgate defines a latch to secure the tailgate to at least one of the first upstanding panel and the second upstanding panel. The truck bed extender further includes at least one interlock member secured to one of the walls sized and shaped to be releasably captured by the latch of the tailgate. Desirably, the interlock member comprises a buckle or a cylindrical interlock portion rigidly secured to the connecting wall. Significantly, this stabilizes the tailgate against movement when the vehicle strikes an object, such as a speed bump.

In one embodiment, there is provided a truck bed extender for use with the vehicle having an open storage bed having a rear end, a first upstanding side panel to one side of the bed, a second upstanding side panel to an opposite side of the bed and a tailgate, a first forward mounting station fixed with respect to the first panel, a second forward mounting station fixed with respect to the second panel, a first rearward mounting station fixed with respect to the first panel and a second rearward mounting station fixed with respect to the second panel. The apparatus includes a first sidewall, a second sidewall, a connecting wall extending between a first sidewall and the second sidewall, a first mount secured to the first sidewall and the second mounts secured to the second sidewall. The first sidewall, and the second sidewall and the connecting wall cooperate to form a generally U-shaped frame. The first mount comprises a first interlocking member and the second mount comprises a second interlocking member. The extender is mountable in a first position wherein the connecting wall is in a substantially vertical position spaced above the tailgate rearward of said rear end of said bed, and a second position wherein the connecting wall is in a substantially vertical position forward of the rear end of the bed and spaced above the rear end of the bed.

In one embodiment, there is provided a truck bed extender for use with the vehicle having an open storage bed having an open end, first upstanding side panel to one side of the bed having an inner side having a lower end and an upper end, a second upstanding side panel to an opposite side of the bed having an inner side and a tailgate, a first mounting station fixed with respect to the first upstanding panel defining a first station surface, and a second mounting station fixed with respect to the second upstanding panel defining a second station surface. The apparatus includes a first sidewall, a second sidewall, a connecting wall extending between the first sidewall and the second sidewall, a first mount on the first sidewall and a second mount on the second sidewall. The first sidewall, the second sidewall and the connecting wall cooperate to form a generally u-shape frame having a first open side and a second open side. The first mount comprises a first interlocking member defining a first mount surface and the second mount comprises a second interlocking member defining a second mount surface. The first station surface and the first mount surface, and the second station surface and the first mount surface cooperate to secure the apparatus to the vehicle so that the apparatus is in an upright position over the tailgate rearward of the rear end of the bed with the first open side facing away from the tailgate and the second open side facing toward the tailgate. One of the first station surface and the first mount surface defines a first opening through which the other of the first station surface and the first mount surface can be withdrawn from the inner side of the first panel to disengage the extender from the first panel. One of the second station surface and the second mount surface defines a second opening through which the other of the second station surface and the second mount surface can be withdrawn from the inner side of the second panel to disengage the extender from the second panel. The first mount forms a single piece with a portion of the wall extending at least the majority of the distance between the upper end and the lower end of the first panel.

In one embodiment, there is provided a vehicle bed extender for use with a vehicle having an open storage bed having a rear end, a first upstanding side panel to one side of said bed having an inner side, a second upstanding side panel to an opposite side of said bed having an inner side and a tailgate. The extender comprises a first side wall, a second side wall, a connecting wall extending between the first side wall and the second side wall, a first mount comprising a first interlocking portion, a first mounting station, a second mount comprising a second interlocking portion, and a second mounting station. The first side wall, the second side wall and the connecting wall cooperate to form a generally U-shaped frame having a first open side and a second open side. The first mounting station is configured to be fixed with respect to one of the first upstanding side panel and the second upstanding side panel. The first mounting station is also configured to engage the first interlocking portion. The first mounting station comprises a first stationary portion and a first moveable portion. The first moveable portion comprises a first stop configured to prevent the first interlocking portion from disengaging from the first mounting station when the first moveable portion is in a first position. The second mounting station is configured to be fixed with respect to one of the first upstanding side panel and the second upstanding side panel. The second mounting station is also configured to engage the second interlocking portion. The second mounting station comprises a second stationary portion and a second moveable portion. The second moveable portion comprises a second stop configured to prevent the second interlocking portion from disengaging from the second mounting station when the first moveable portion is in a first position. The first mount, the first mounting station, the second mount, and the second mounting station cooperate to secure the extender to the vehicle so that the extender is in an upright position over the tailgate rearward of the rear end of the bed with the first open side facing away from the tailgate and the second open side facing toward the tailgate. In this position, the extender provides access from above to a space between the first side wall and the second side wall.

In the foregoing embodiment, the first moveable portion of the first mounting station can be biased toward the first position. When biased accordingly, the first moveable portion assumes the first position in the absence of external pressure. Similarly, the second moveable portion of the second mounting station can biased toward the first position such that the second moveable portion assumes the first position in the absence of external pressure.

Advantageously with respect to the foregoing embodiment, the first moveable portion is moveable from the first position to a second position by a first application of manual pressure. In the second position, the first stop is positioned to allow the first interlocking portion to disengage from the first mounting station. Upon release of the first application of manual pressure, the first moveable portion returns to the first position. Similarly, the second moveable portion is moveable from the first position to a second position by a second application of manual pressure. In the second position, the second stop is positioned to allow the second interlocking portion to disengage from the second mounting station. Upon release of the second application of manual pressure, the second moveable portion returns to the first position.

The biasing of the first moveable portion and the biasing of the second moveable portion can be caused by a first spring and a second spring, respectively.

According to an embodiment, the first moveable portion and the second moveable portion are configured to resist movement toward the second position when the bed extender moves so as to bring at least a portion of the bed extender into contact with the first stop or the second stop. Thus, this embodiment resists disengagement of the first interlocking portion from the first mounting station and disengagement of the second interlocking portion from the second mounting station.

In one embodiment, there is provided a vehicle bed extender mounting station. The vehicle bed extender mounting station is configured to be fixed with respect to a first upstanding side panel or a second upstanding side panel on a vehicle having an open storage bed having a rear end, the first upstanding side panel, the second upstanding side panel to an opposite side of said bed and a tailgate. The mounting station comprises a stationary portion and a moveable portion. The stationary portion is configured to be attached to the first upstanding side panel or the second upstanding side panel so as to fix the mounting station with respect to the first upstanding side panel or the second upstanding side panel. The moveable portion is attached to the stationary portion. The moveable portion is moveable with respect to the stationary portion and comprises a handle and a stop. The moveable portion is biased toward a first position in which the stop and the stationary portion cooperate to engage an interlocking portion of a mount of the vehicle bed extender so as to secure the vehicle bed extender against detachment from the mounting station. The moveable portion is further configured to assume, upon a manual application of pressure to the handle, a second position in which the interlocking portion can be disengaged from the mounting station so as to allow the vehicle bed extender to be detached from the mounting station. The moveable portion returns to the first position upon release of the application of manual pressure. The moveable portion is configured to move toward the first position when the interlocking portion comes into contact with the stop such that the moveable portion and the stationary portion cooperate to resist detachment of the vehicle bed extender as a result of a movement of the interlocking member without a concurrent application of manual pressure to the handle.

In the mounting station of the foregoing embodiment, the stationary portion can further comprise a stationary cusp, a lower curved portion, and a vertical portion. The stationary cusp, the lower curved portion, and the stop cooperate to define a circle through about 300 degrees when the moveable portion is in the first position. The interlocking portion is substantially circular in shape and has an outer diameter that is just smaller than the inner diameter of the circle defined by the stationary cusp, the lower curved portion, and the stop. A maximum distance between the vertical portion and the stationary cusp is larger than the outer diameter such that when the moveable portion is in the second position the interlocking portion can pass between the stationary cusp and the vertical wall without such passage being impaired by the stop.

The mounting station's moveable portion can further comprise a spring and the stationary portion and the moveable portion can be attached at a pivot. In this embodiment, rotation of the moveable portion about the pivot in a first direction causes the moveable portion to assume the first position and rotation about the pivot in a second direction opposite to the first direction causes the moveable portion to assume the second position. Furthermore, the spring is configured to resist any forces exerted on the stop that would, in the absence of the spring, cause the moveable portion to rotate about the pivot in the second direction.

According to one embodiment, a method is described for an individual to mount a vehicle bed extender on a vehicle having an open storage bed having a rear end, a first upstanding side panel to one side of said bed, a second upstanding side panel to an opposite side of said bed and a tailgate, a first mounting station fixed with respect to said first upstanding panel, and a second mounting station fixed with respect to said second upstanding panel. The method comprises: providing a generally U-shaped vehicle bed extender, said vehicle bed extender having a first side wall, a second side wall, a connecting wall extending between said first side wall and said second side wall, a first mount with a first interlocking portion secured to said first side wall, and a second mount with a second interlocking portion secured to said second side wall; moving a moveable portion of said first mounting station and a moveable portion of said second mounting station such that said moveable portions are in a first position that allows said first mounting station to engage one of said first interlocking portion and said second interlocking portion and allows said second mounting station to engage the other of said first interlocking portion and said second interlocking portion; positioning said first side wall and said second side wall between said first side panel and said second side panel, such that said first interlocking portion is positioned above but not engaged by one of said first mounting station and said second mounting station and said second interlocking portion is positioned above but not engaged by the other of said first mounting station and said second mounting station, so that said connecting wall is in substantially vertically aligned over said tailgate rearward of said rear end of said bed and said extender provides access from above to a space between said first side wall and said second side wall; moving said bed extender substantially downward without substantially changing said substantial vertical alignment of said connecting wall, such moving causing said first mounting station of said first side panel to engage one of said first interlocking portion and said second interlocking portion, and causing said second mounting station of said second side panel to engage the other of said first interlocking portion and said second interlocking portion, so that said bed extender is in a first mounting position with said connecting wall in a substantially vertical position over said tailgate rearward of said rear end of said bed and said extender provides access from above to a space between said first side wall and said second side wall; and moving said moveable portion of said first mounting station and said moveable portion of said second mounting station such that said moveable portions are in a second position that prevents disengagement of said first mounting station to one of said first interlocking portion and said second interlocking portion and prevents disengagement of said second mounting station from the other of said first interlocking portion and said second interlocking portion.

In one embodiment, the foregoing method further comprises moving said bed extender from said first mounting position to a second mounting position in which said connecting wall is in a substantially vertical position over said rear end of said bed and forward of said tailgate and said extender provides access from above to a space between said first side wall and said second side wall. In an embodiment, moving the bed extender from the first mounting position comprises rotating the bed extender about an axis.

In one embodiment, there is provided a vehicle bed extender for use on a vehicle having an open storage bed having a rear end, a first upstanding side panel to one side of said bed, a second upstanding side panel to an opposite side of said bed and a tailgate, a first mounting station fixed with respect to said first upstanding panel, and a second mounting station fixed with respect to said second upstanding panel. The bed extender comprises a first side wall, a second side wall, a connecting wall, a first mount with a first interlocking portion secured to the first side wall, and a second mount with a second interlocking portion secured to the second side wall. The connecting wall extends between the first side wall and the second side wall. Furthermore, the vehicle bed extender is configured to be installed by an individual in accordance with one of the methods outlined in the foregoing two paragraphs.

BRIEF DESCRIPTION OF THE DRAWINGS

These and other features of the invention will now be described in connection with the accompanying drawings, in which:

FIG. 17B is an exploded persective view showing the components of the mounting station of FIG. 16A.

FIG. 19 is a top plan view of the bed extender of FIG. 18.

FIG. 20 is a front elevational view of the bed extender of FIG. 18.

FIGS. 21-25 are schematic views illustrating the mounting of the extender of FIG. 18.

FIGS. 21A-25A are corresponding schematic views illustrating the position of the bracket and male member during the mounting of the extender of FIG. 18.

FIGS. 28-33 illustrate an alternative connector.

FIGS. 34-37 illustrate an alternative holder pair.

DETAILED DESCRIPTION OF THE PREFERRED EMBODIMENT

Figure 1:
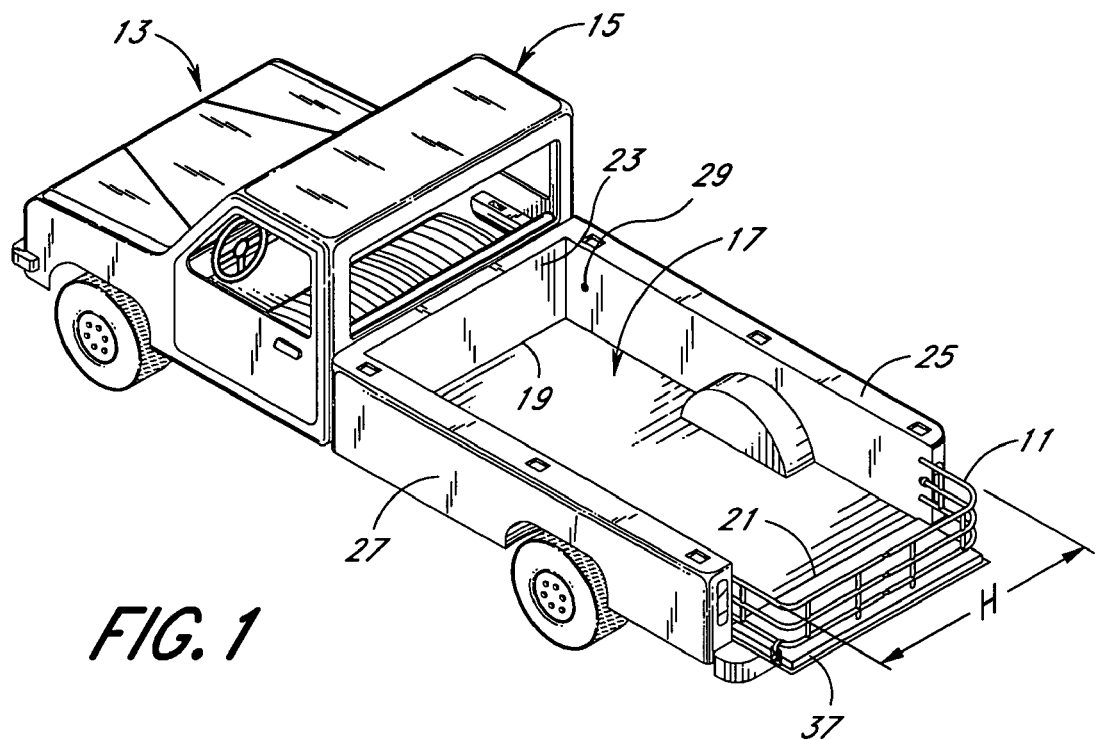
FIG. 1 is a perspective view of a preferred embodiment of the truck bed extender of the present invention mounted on a vehicle in a first position.
Figure 2:
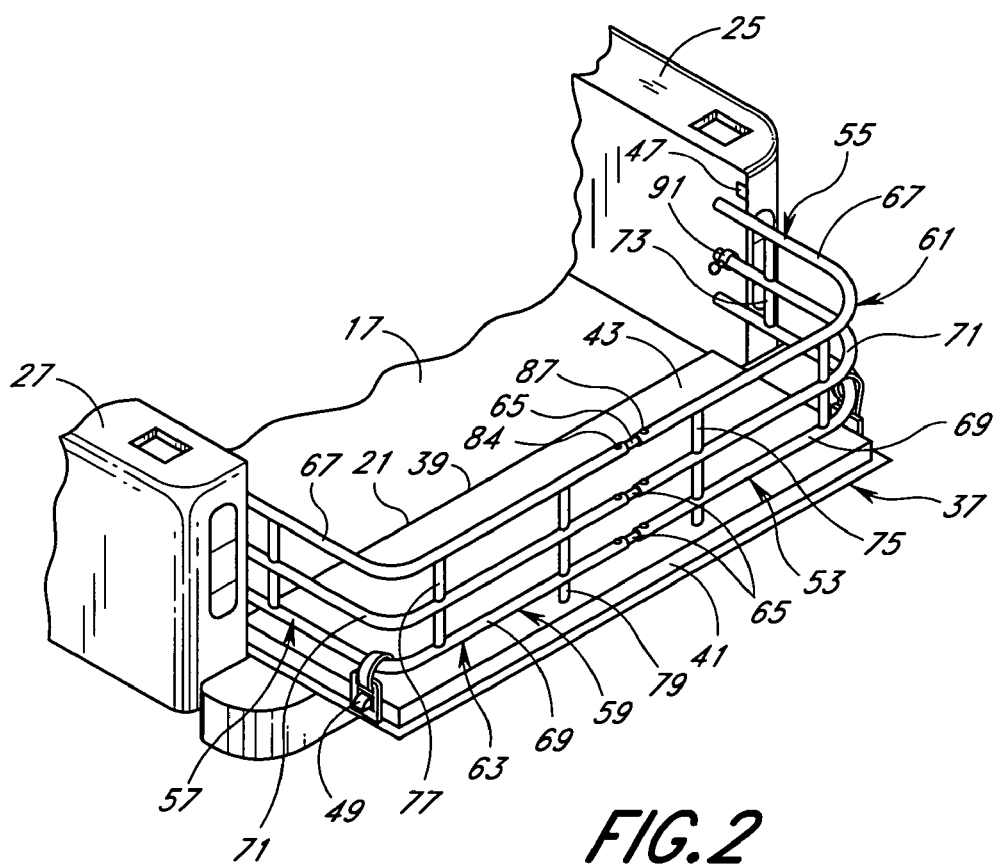
FIG. 2 is a enlarged partial perspective view of the vehicle and truck bed extender of FIG. 1.
Figure 3:
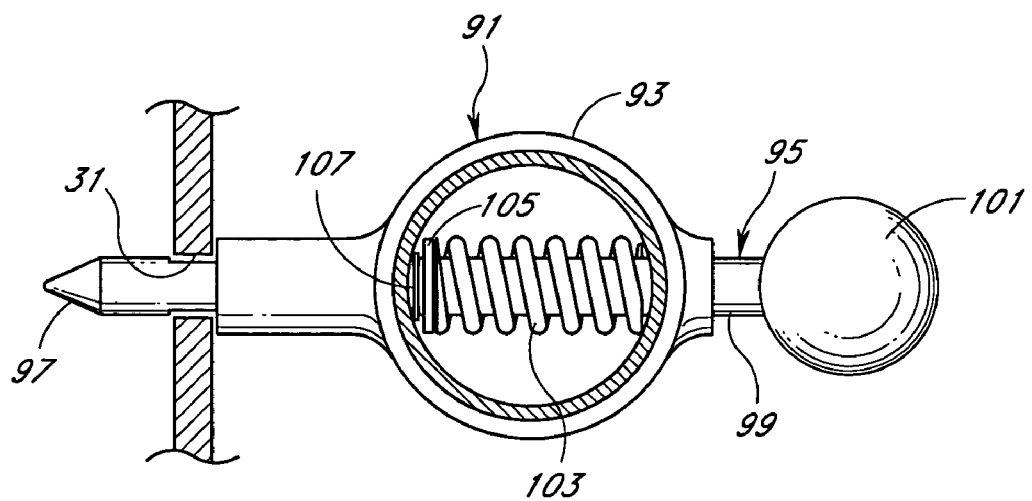
FIG. 3 is an enlarged sectional view of the mount of the truck bed extender of FIG. 1.

The preferred embodiment of a multi-purpose apparatus or truck bed extender 11 will now be described with reference to the figures. Referring to FIGS. 1 and 2, the truck bed extender 11 is shown mounted on a truck 13 having a cab 15 to the rear of which is a storage bed 17. The storage bed 17 has a front end 19 and a rear end 21. The front end 19 of the storage bed is defined by a front upstanding panel 23 and the sides of the storage bed are defined by a first side upstanding panel 25 and a second side upstanding panel 27. The first side upstanding panel 25 defines a first forward mounting station or aperture 29 and a first rearward mounting station or aperture 31 (FIG. 3), the purpose and location of which will be discussed in greater detail below. Likewise, the second side upstanding panel 27 defines a second forward aperture (not shown) and a second rearward aperture (not shown).

At the rear end 21 of the storage bed 17 is a tailgate 37. The tailgate has a hinge end 39 and a distal end 41. The tailgate 37 defines a planar inner surface 43 extending between the hinge end 39 and distal end 41 of the tailgate. The tailgate 37 further comprises a first lock mechanism (not shown) which mates with a first latch 47 mounted on the rear end of the first upstanding panel 23. A tailgate 37 further includes a second lock mechanism 49 which interlocks with a second latch (not shown) mounted on the second side upstanding panel 27. The first lock mechanism and second lock mechanism 49 are selectably releasable by means of a release actuator (not shown) mounted at the outer surface of the distal end of the tailgate.

The truck bed extender 11 includes a frame 53 having a first side wall 55, a second side wall 57 and a connecting wall 59 extending between the first side wall 55 and second side wall 57. The frame 53 and, therefore, the connecting wall 59 define a horizontal span H which is slightly less than the distance between the first side upstanding panel 25 and second side upstanding panel 27 of the truck 13. The frame 53 is formed by a first L-shaped section 61, a second L-shaped section 63 and a plurality of connecting sections 65.

Both L-shaped sections 61, 63 comprise a generally L-shaped upper cross-beam 67, a generally L-shaped lower cross-beam 69 and a generally L-shaped middle cross-beam 71. Advantageously, each cross-beam comprises a single piece of 1.5 inch outer diameter, 0.058 inch wall thickness, 6061-T6 aluminum tubing.

The cross-beams 67, 69 and 71 are advantageously connected by an outer vertical strut 73, an inner vertical strut 75 and a middle vertical strut 77. The struts 73, 75, 77 desirably extend through mating openings in the cross-beams 67, 69, 71 and comprise one inch outer diameter, 0.058 inch wall thickness, 6061-T6 aluminum tubing. The use of angled aluminum tubing provides for high strength, low weight and ease of manufacture.

As shown in FIG. 2, the inner strut 75 and middle strut 77 are desirably positioned along the connecting wall 59 and the outer strut 73 is desirably positioned along the distal end of the side wall. Advantageously, the inner strut 75 is longer than the other struts and projects downward from the lower crossbeam 69 so as to define an inner strut foot 79.

The first L-shaped section 61 and second L-shaped section 63 are connected by the plurality of connecting sections 65. Specifically, there is an upper connecting section, a lower connecting section and a middle connecting section. Desirably, the connecting sections comprise a 7 inch long, 1-⅜ inch outer diameter, 0.058 inch wall thickness, 6061-T6 aluminum tube. The connecting sections are slidable within and, desirably forms a slip-fit with, the first L-shaped section 61 and second L-shaped section 63, and are each desirably locked in place by a pair of locking screws 87.

Figure 4:
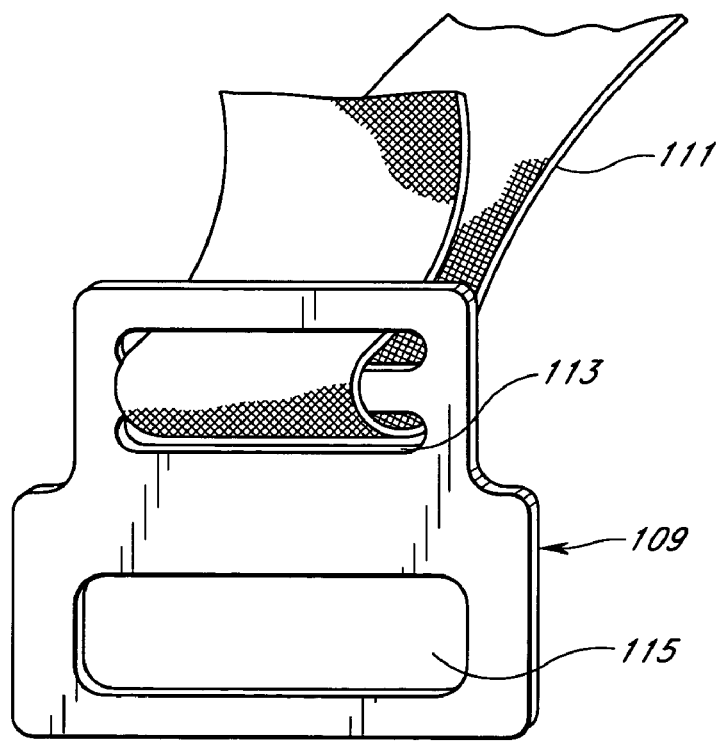
FIG. 4 is an enlarged perspective view of a belt and buckle locking device of the truck bed extender of FIG. 1.

Approximately ⅝ inch from the outer end of each middle crossbeam 71 is a 0.328 inch diameter horizontal bore mounted over the middle crossbeam 71 aligned with the bore is a mount 91 having a body 93 which defines a throughbore. The body has an annular middle portion with generally diametrically opposed cylindrical projections corresponding to the throughbore. The mounts 91 are secured respectively to the first L-shaped section and second L-shaped section so that the throughbores are coaxially aligned. The mount 91 further includes a generally cylindrical male member 95 having a cone-shaped engagement end 97 and an actuating end 99. A handle 101 is threaded on the actuating end 99 and the male member 95 is mounted for reciprocal movement within the body by a spring 103 surrounding the male member within the body 93 of the mount. The precompressed spring desirably has one end biased against the body 93 of the mount and another end which is biased against a washer 105 which is secured against outward movement relative the male member 95 by a C clip 107. Referring now to FIG. 2, a buckle 109 is secured to each of the lower crossbeams 69 by means of a strap 111. As shown in FIG. 4, the buckle 109 is generally rectangular with a narrower upper portion and a wider lower portion. The buckle 109 desirably forms a pair of parallel slots 113 for receiving the strap 111 and a larger opening 115 for mating with one of the lock mechanisms 49 of the vehicle.

The installation and operation of the truck bed extender 11 will now be described.

When it is desired to ready a vehicle for use with the truck bed extender 11, the truck bed extender 11 can be placed in the desired position on the tailgate 37 so that the distal end of the first side wall 55 and distal end of the second side wall 57 extend along the inner surface of the rear end of the first side upstanding panel 25 and the second side upstanding panel 27, respectively. When the truck bed extender 11 is in the desired position, its width can be adjusted by sliding the first or second L-shaped sections 61 and 63 relative the connecting section 65 and securing it in position by means of one of the locking screws 87. Once the extender 11 has been adjusted so that it has the desired horizontal span H, the handle 101 of each of the mounts 91 can be pressed outward so that the engagement end 97 of the male member 95 presses hard against the respective first side upstanding panel 25 and second side upstanding panel 27 to mark the location for drilling the first rearward aperture 31 and second rearward aperture 35. This approach eliminates difficulties in determining the proper position of the apertures 31 and 35. Once the first rearward aperture 31 and second rearward aperture 35 are drilled into the first side upstanding panel 25 and second side upstanding panel 27, respectively, the truck bed extender 11 is ready for operation. Importantly, no additional brackets or modifications are required, so that when the truck bed extender is not in use, there are no brackets in the way, and virtually no cosmetic change to the appearance of the truck 13.

In use, the truck bed extender is simply positioned on the tailgate 37 so that the engagement ends 97 of the mounts 91 extend through the respective first rearward mounting station or aperture 31 and second rearward mounting station or aperture (not shown). The surface of each mount 91 (mount surface) engages the surface of each mounting station 31 (station surface). In this position, the truck bed extender provides a strong, secure retaining device while the openings between the respective crossbeams and struts permit the flow of air to minimize air resistance. If it is desired to remove the truck bed extender 11, the handles 101 secured to each of the male members 95 are simply pulled inward causing engagement ends 97 of the male members 95 to retract from the first rearward aperture 31 and second rearward aperture 35 and the truck bed extender can be removed.

As disclosed herein, while only one mount 91 is illustrated and labelled in the Figures, the bed extender comprises two mounts, one on each side. For ease of understanding, in this paragraph the illustrated mount 91 is referred to as a first mount 91, while the mount that is not shown is referred to as a second mount. Similarly for ease of understanding, the mounting station to which the first mount 91 is attached, as illustrated, is referred to as a first mounting station, and the mounting station that is not shown is referred to as a second mounting station. As illustrated in FIG. 2, the bed extender can be installed such that the first mount 91 aligns with and engages the first mounting station 31 and the second mount aligns with and engages the second mounting station. FIGS. 1-6 make it apparent, however, to a person of ordinary skill in the art, that the first mount 91 can just as easily be aligned with and engage the second mount station, and the second mount can just as easily be aligned with and engage the first mounting station 31. It is apparent from FIGS. 1, 2, 5, and 6 that the first mount 91 is located at the same vertical distance from the truck bed whether the first mount 91 is positioned near the first mounting station or whether the first mount 91 is positioned near the second mounting station by rotating the bed extender horizontally 180 degrees. Furthermore, it is apparent from FIG. 3 that the mounts 91 are symmetrical and accordingly can engage either of the mounting stations. Accordingly, it is apparent, from FIGS. 1-6, to a person of ordinary skill in the art, that one can detach the bed extender, rotate the bed extender horizontally 180 degrees such that the first mount 91 and the second mount switch sides, and install the bed extender such that the first mount 91 engages the second mounting station and the second mount engages the first mounting station 31.

The truck bed extender can be further secured against undesired rotation about the mounts 91 by means of the buckle 109 and strap 111, by simply securing the buckles 109 in the first lock mechanism (not shown) and second lock mechanism 49, respectively, of the tailgate 37. Advantageously, the buckles are configured so that they are secured in place by the lock mechanisms and are selectably releasable by the tailgate's own release actuator.

Figure 5:
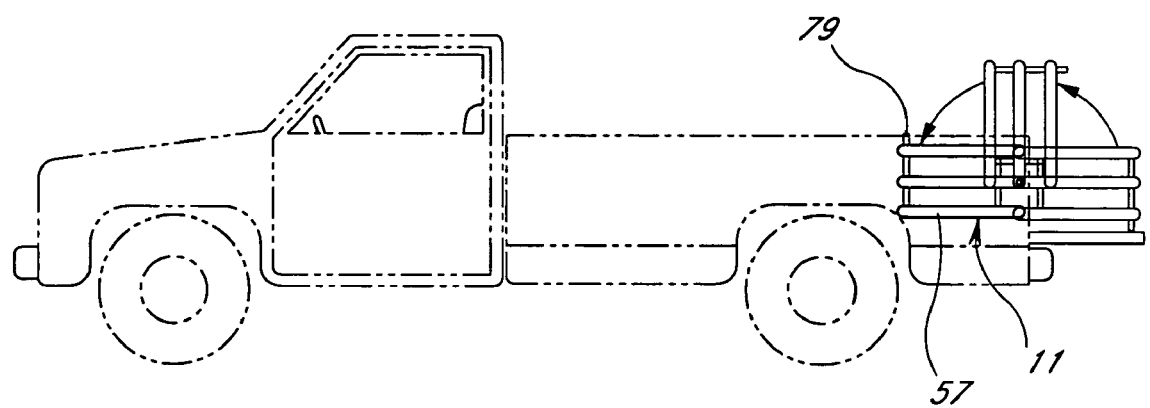
FIG. 5 is a partial sectional view illustrating the pivoting of the truck bed extender of FIG. 1 from a first position (shown in phantom) to a second position.
Figure 6:
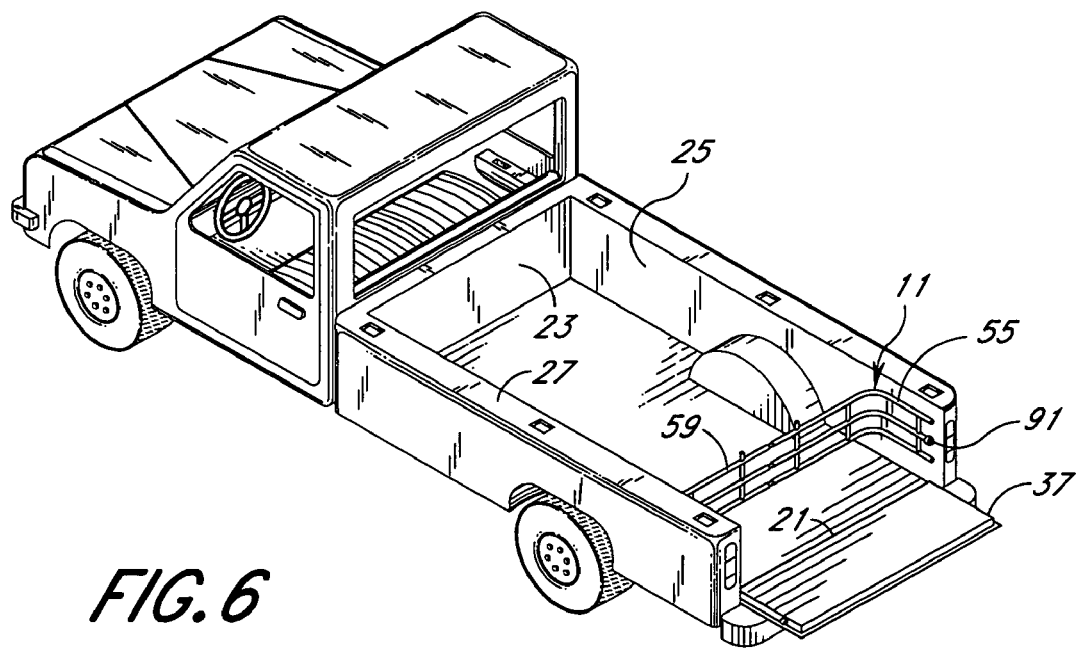
FIG. 6 is a top plan view of the truck bed extender and vehicle of FIG. 1 in a second position.

Importantly, in the event it is desired to use the truck bed extender 11 to form a rear storage compartment, as shown in FIG. 5, the truck bed extender can be quickly and easily pivoted about the coaxial male members 95 so that the connecting wall 59 is in a vertical position spaced inward from the rear end 21 of the storage bed 17 and, therefore, the tailgate 37. In this position, the truck bed extender 11 provides a convenient open upper-ended storage compartment to secure grocery bags or other items against movement within the truck bed.

Advantageously, the truck bed extender 11 is extremely strong, but at the same time lightweight. In addition, because its structural configuration lends itself to construction with a minimum of parts, the extender can be manufactured at a relatively low cost.

Figure 7:
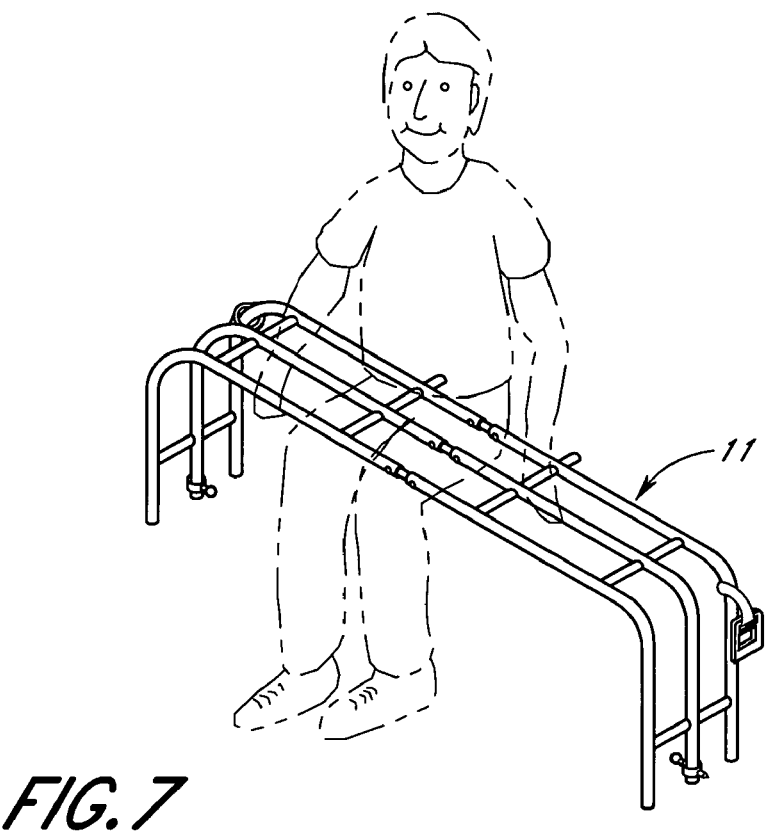
FIG. 7 is a perspective view of the truck bed extender of FIG. 1 illustrating its use as a bench.

Advantageously, as shown in FIG. 7, the truck bed extender provides a convenient work or picnic bench when it is removed from the vehicle. Specifically, when the distal ends of the first side wall 55 and second side wall 57 are placed on the ground, one or more individuals can sit on the connecting wall 59.

Figure 8:
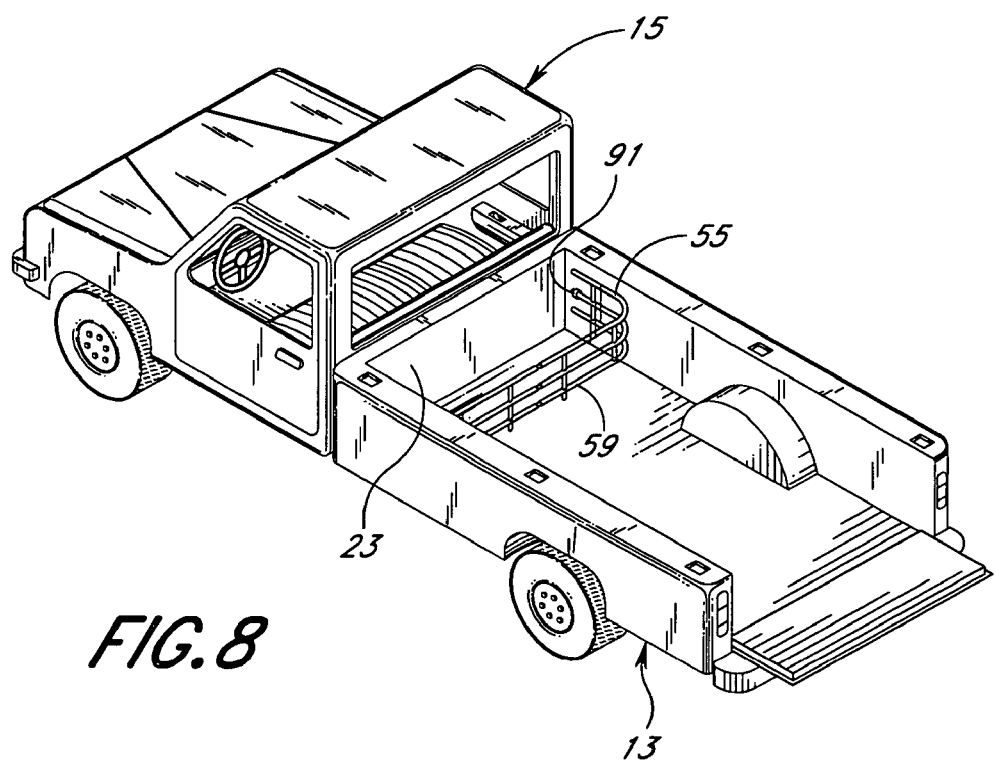
FIG. 8 is a perspective view of the truck bed extender and vehicle of FIG. 1 showing the truck bed extender in a third position.

Finally, as shown in FIG. 8, the truck bed extender 11 is also capable of forming a forward storage compartment adjacent the cab 15 of the truck 13. Such a position is often desirable when transporting pets, due to the proximity to the driver and the wind resistance afforded by the cab 15. If it is desired to use the truck bed extender to form such a forward storage compartment, a first forward aperture 29 and a second forward aperture (not shown) are desirably formed in the first side upstanding panel 25 and second side upstanding panel 27, respectively by locating and drilling the apertures in a manner similar to that of the rearward apertures 31 and 35. It is then a simple matter to place the truck bed extender 11 in position so that the first side wall 55 and second side wall 57 extend forward from the connecting wall so that the connecting wall 59 is spaced rearward from the front upstanding panel 23 of the truck 13. Again, removal is easily accomplished by simply pulling the handles 101 inward so that engagement ends 97 the male members 95 are retracted within the mounts 91 so that they are withdrawn from the first forward aperture 29 and second forward aperture (not shown).

Figure 9:
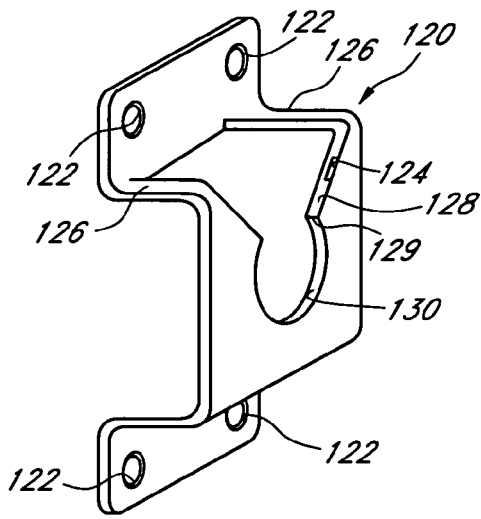
FIG. 9 is a perspective view of a female element or bracket of a mounting mechanism for the extender, in accordance with a second preferred embodiment of the present invention.
Figure 10:
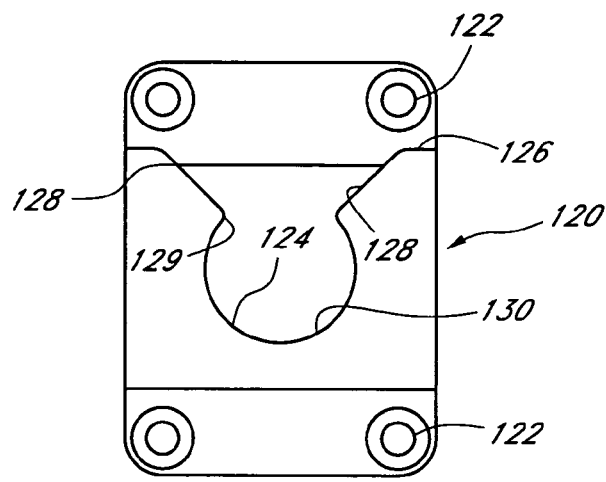
FIG. 10 is a front elevational view of the bracket of FIG. 9.
Figure 11:
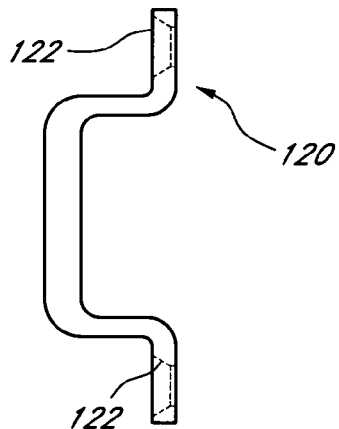
FIG. 11 is a side elevational view of the bracket of FIG. 9.

Referring now to FIGS. 9 to 11, a mounting station, such as a female member or bracket 120 is illustrated in accordance with a second preferred embodiment. The bracket 120 includes a plurality of screw holes 122 which facilitate mounting the bracket 120 to the panels 25, 27 (FIG. 1) of the truck 13. Preferably, four such brackets 120 are mounted by screws through the screw holes 122 to the panels 25, 27 at positions centered about positions of the forward aperture 29 and rearward aperture 31 of the first embodiment (FIGS. 1-8).

The mounting station or bracket 120 has an upper edge 124 which defines an aperture or slot with an upper opening and a relatively more narrow lower opening. In the illustrated embodiment, the edge 124 includes a pair of generally horizontal upper surfaces 126. A pair of slanted portions 128 extend inwardly and downwardly from the horizontal portion 126, each terminating at a cusp 129. A lower curved portion 130 defines a generally circular upper station surface and extends downwardly from and joins the cusps 129 to one another.

Advantageously, the curved portion 130 defines greater than 180E of a circle, and is illustrated defining about 300E of a circle. Accordingly, the slot defined by the upper edge 124 is more narrow at the cusps 129 than at the widest point of the curved portion 130 below.

Figure 12:
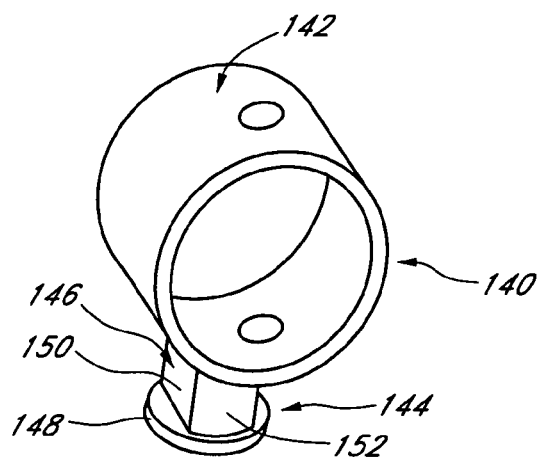
FIG. 12 is a perspective view of a mount, including a male element, of the mounting mechanism of the second embodiment.

With reference to FIG. 12, a mount 140 is shown, including a body 142 which defines a generally horizontal cylindrical bore. As with the mount 91 of the first embodiment (FIG. 3), a mount 140 can be fitted over each middle crossbeam 71 (FIG. 2) approximately ⅝ inch from the outer end.

A male element 144 extends from the body 142. The male element 144, in turn, includes an axle portion 146 and a relatively wider locking portion 148, illustrated as a disk. The axle portion 146 has two generally horizontal, opposed flat sides 150 and two opposed curved sides 152 (one of each shown). The maximum spacing between the opposed flat sides 150 defines a first width of the axle portion 146. The first width is less than the spacing between the cusps 129 on the bracket 120 (FIGS. 9-11). The maximum spacing between the opposed curved sides 152 define a second width between them, where the second width is greater than the spacing between the cusps 129 on the bracket 120. Preferably, the curved sides 152 have the same curvature as the curved portion 130 of the mounting station or bracket 120 (FIGS. 9-11) with a slightly smaller radius of curvature, such that the surface of the curved sides 152 defines a mount surface that engages the station surface of the mounting station or bracket 120.

The extender of the second preferred embodiment (not shown) will resemble the extender 11 of FIG. 2, except including a mount 140 at the end of each middle cross-beam. Accordingly, the following discussion will refer to components of second preferred embodiment by reference numerals assigned to like components of the first preferred embodiment (FIGS. 1-8).

In mounting the extender 11 to the truck 13 (which already has brackets 140 mounted thereto), a user can lift the extender 11 with the connecting wall 59 facing up and the side walls 55, 57 extending downwardly. The axle portions 146 are then aligned with the slots of the brackets 140. In this position, the flat sides 150 of the axle portions 146 are generally vertical. The extender 11 is then lowered. Since the first width is narrower than the spacing between the cusps 129 of the bracket 120, each axle portion 146 fits between the cusps 129 of a corresponding bracket 120. The 148 fits into the wider upper opening defined by the horizontal upper surfaces 126.

As the extender 11 is lowered, a curved side 152 of the male element 144 contacts the curved portion 130 of the corresponding female element or bracket 120. The extender 11 is then rotated outward or inward about 90E (see FIG. 5). The curved sides 152 of the axle portions 146 mate with and journal within the curved portion 130 of the bracket 120. When thus rotated, the cusps 129 prevent the axles 146 from lifting out of brackets 120, as will be understood by one of skill in the art. To remove the extender 11, the extender 11 must be rotated until the flat sides 150 of the axle portions 146 are approximately vertical, and can slip past the cusps 129 on the brackets 120.

Advantageously, the extender 11 of the second preferred embodiment can be installed or removed without retracting any locking mechanism and without scratching the paint on the interior of the truck bed 17. Accordingly, the users hands can be used solely to lift and rotate the extender 11.

Figure 13:
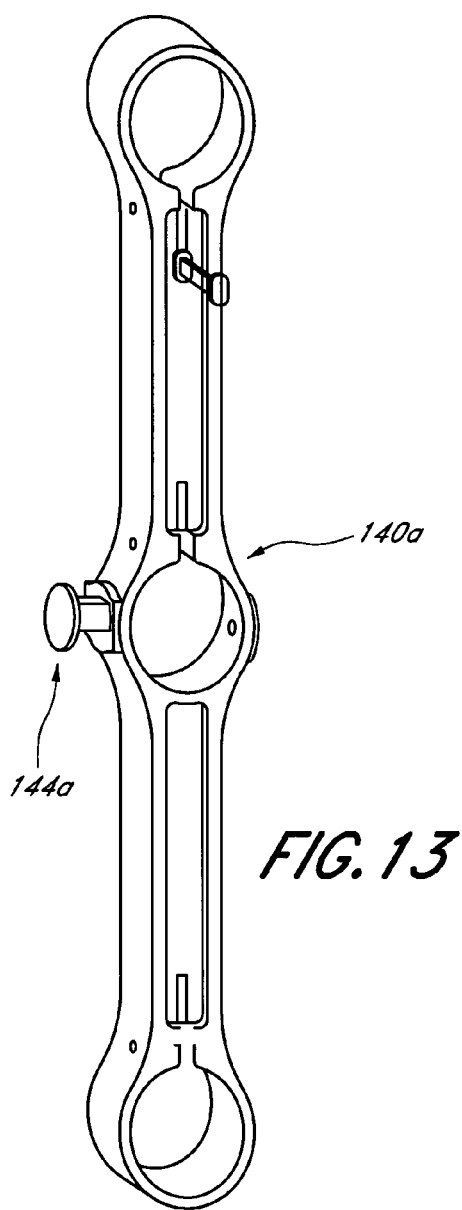
FIG. 13 is a perspective view of a combination mount and strut in accordance with a third preferred embodiment.
Figure 14:
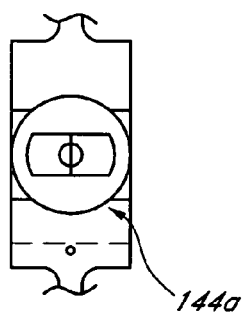
FIG. 14 is an end elevational view of a male element of the mount and strut of FIG. 13.

With reference to FIGS. 13 and 14, a combination mount and strut 140a is shown with a male element 144a, which can be similar to the male element 144 of FIG. 12. By performing both functions of supporting the cross-beams and mounting the extender, this combination mount and strut 140a can simplify the extender design and reduce part numbers.

Figure 15:
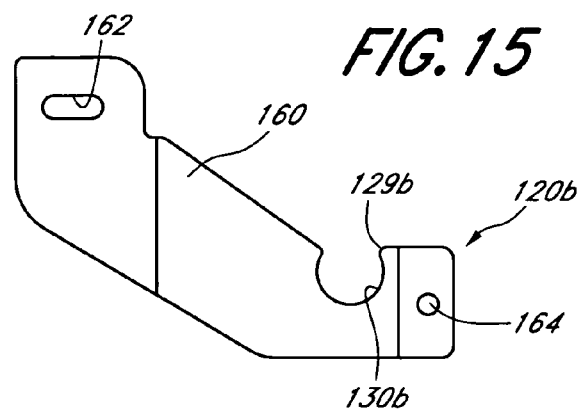
FIG. 15 is a front elevational view of an alternative female element or bracket for use with the mounts of FIG. 12 or 13.

With reference to FIG. 15, an alternative female mounting element or bracket 120b is shown, including an upwardly extending arm 160, a left screw hole 162, and right screw hole 164 for mounting the bracket 120b to a truck panel 27. It will be understood that a second bracket would be provided in a mirror image of that illustrate for the opposite panel 25 of the truck. The arm 160 is oriented such that a curved portion 130b (in which a male mounting element can journal) is appropriately positioned while the left screw hole 162 aligns with a pre-existing screw hole in the truck panel 25 or 27, such as the lower hole for the tailgate latch mechanism 47. This arrangement advantageously reduces the number of screw holes required to be drilled in the truck panels, while still fixing the bracket 120b in a unique position.

Furthermore, it is possible that the arm 160 could be extended further upward, and another screw hole provided in alignment with the upper latch screw of the tailgate latch mechanism 47, thereby eliminating any need for a right screw hole.

Figure 16:
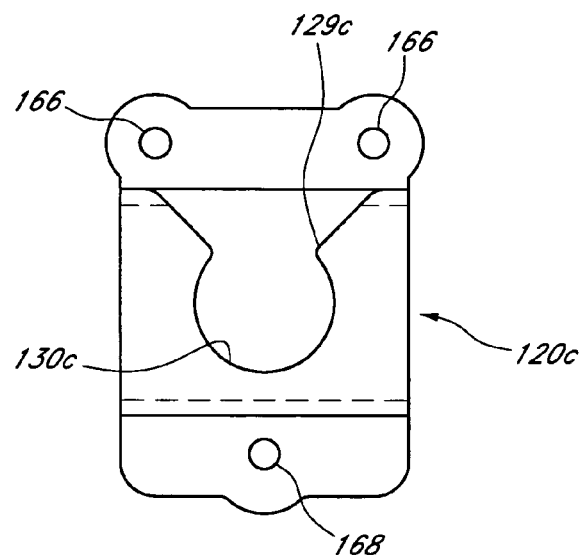
FIG. 16 is a front elevational view of another alternative female element or bracket for use with the mounts of FIG. 12 or 13.
Figure 17:
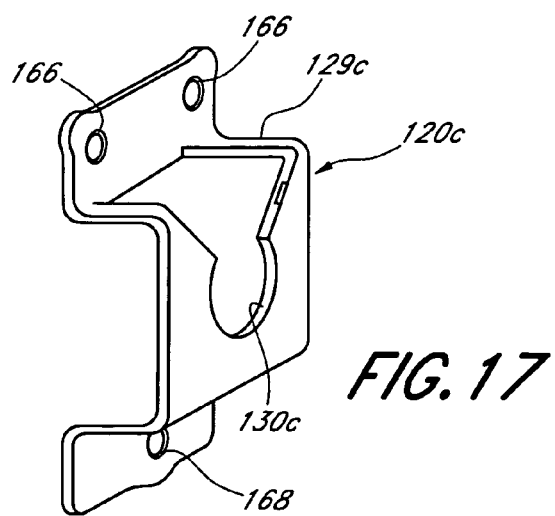
FIG. 17 is a perspective view of the bracket of FIG. 16.

FIGS. 16 and 17 illustrate yet another bracket 120c, having two upper screw holes 166 and one lower screw hole 168. It will be recognized that this arrangement reduces by one the number of screw holes required to be drilled, relative to the bracket 120 of FIGS. 9-11.

Figure 13A:
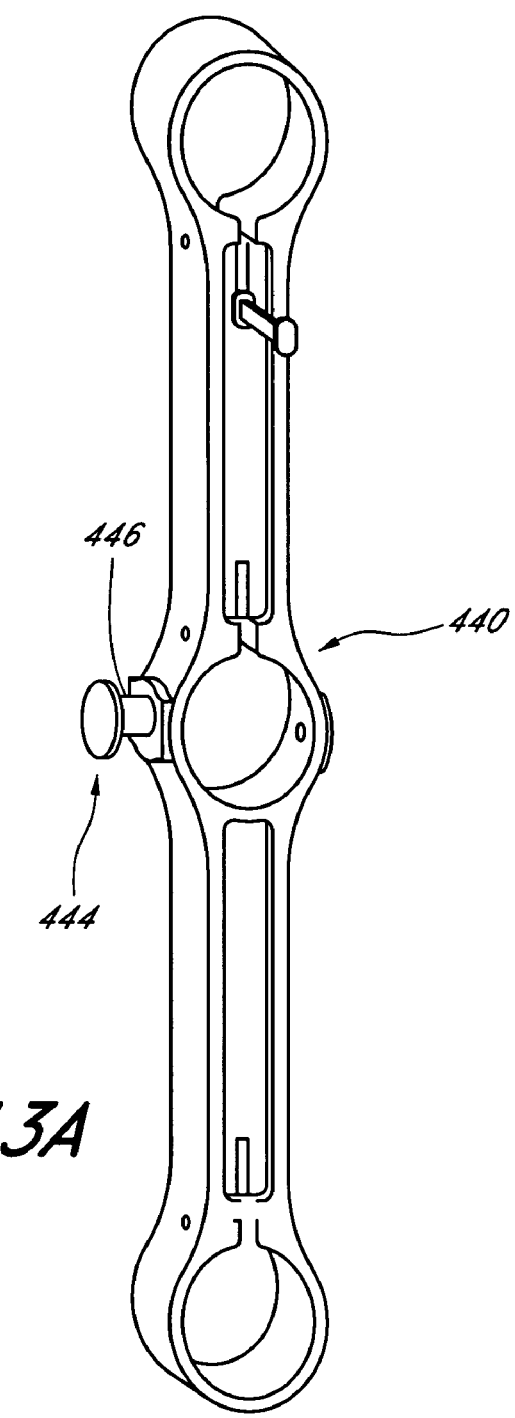
FIG. 13A is a perspective view of a combination mount and strut in accordance with a fourth preferred embodiment.
Figure 14A:
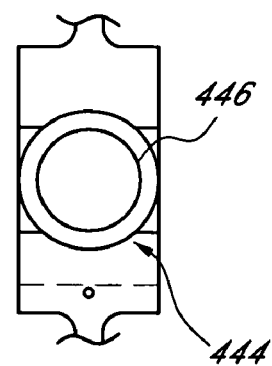
FIG. 14A is an end elevational view a male element of the mount and strut of FIG. 13A.

FIGS. 13A, 14A, 16A, and 17A illustrate another mount 440 and another bracket or mounting station 420 for receiving the mount 440. Referring to FIG. 13A, a mount 440 for mounting the bed extender on the mounting station 420 is described, according to an embodiment. As will be appreciated by a skilled artisan in light of this disclosure, the mount 440 of FIG. 13A has, with a few exceptions, the same components, dimensions, and configuration as the mount 140a of FIG. 13. Indeed, a skilled artisan will appreciate, in light of this disclosure, that the mount 140a can be received into and used with the mounting station 420 of FIG. 16A. The mount 440, in one embodiment, has a male element 444 with an axle portion 446. In one embodiment, as illustrated, the axle portion 446 of FIG. 13A is generally uniformly circular, (e.g. having a generally uniform diameter).

The interaction between the mounting station 440 and a mounting station 420 is now described in general terms. Additionally detail regarding the mounting station 420 is provided below with reference to FIGS. 16A and 17A. Preferably, the diameter of the axle portion 446 is dimensioned so as to interact with a lower curved portion 430 of the mounting station 420, such that the axle portion 446 can be received by or removed from the lower curved portion 430 when a lever 438 of the mounting station is in an open position but the axle portion 446 cannot be received by nor removed from the lower curved portion 430 when the lever 438 is in a closed position. Accordingly, a person can mount the bed extender on a vehicle by moving each lever 438 (on either side of the vehicle) to an open position, positioning the axle portion 446 of each mount 440 such that the lower curved portion 430 surrounds the axle portion 446, and locking each mount 440 into place by moving the lever 438 to a closed position.

Figure 16A:
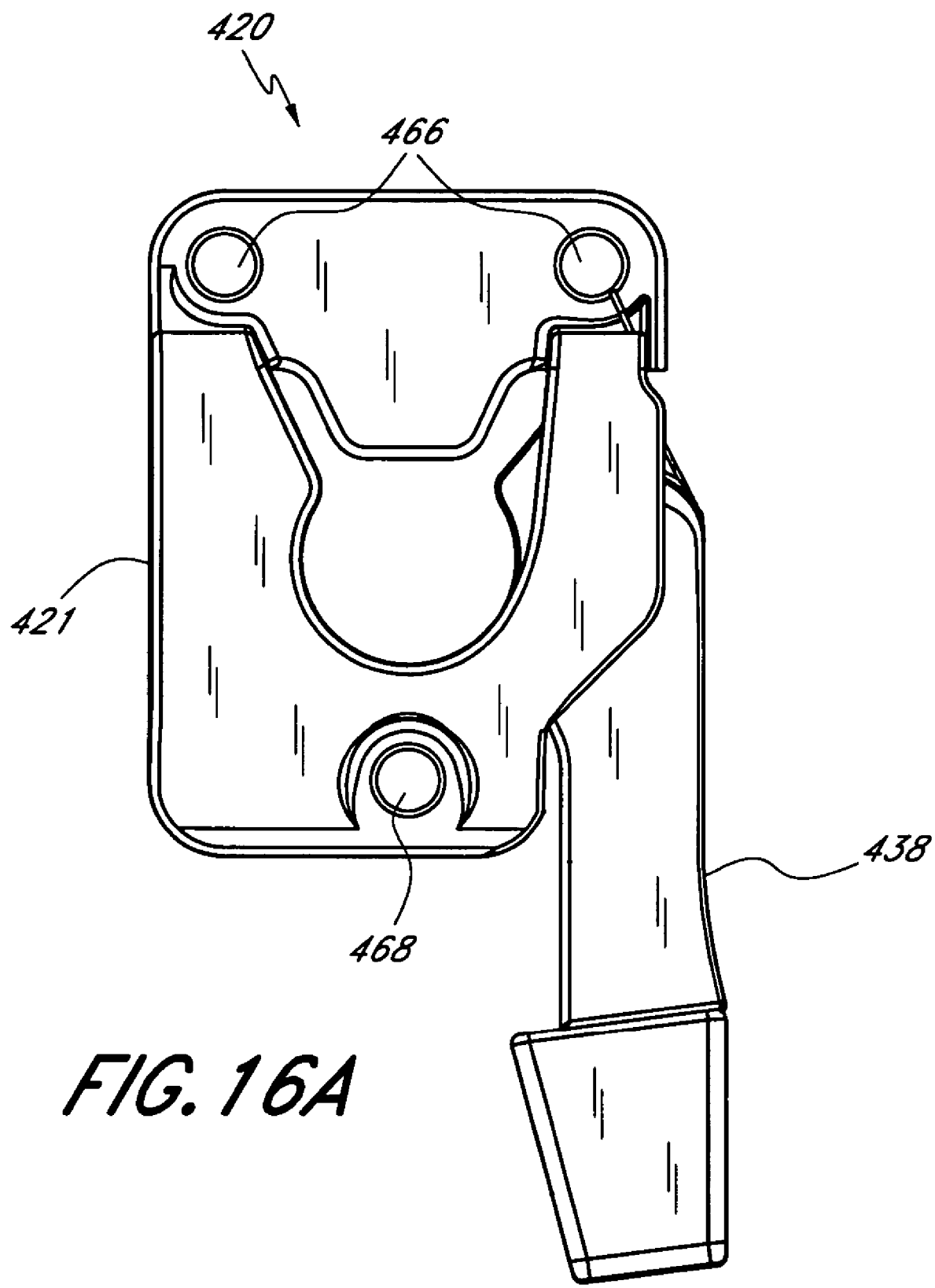
FIG. 16A is a front elevational view of a female element, bracket, or mounting station for use with the mounts of FIG. 12, 13, or 13A
Figure 17A:
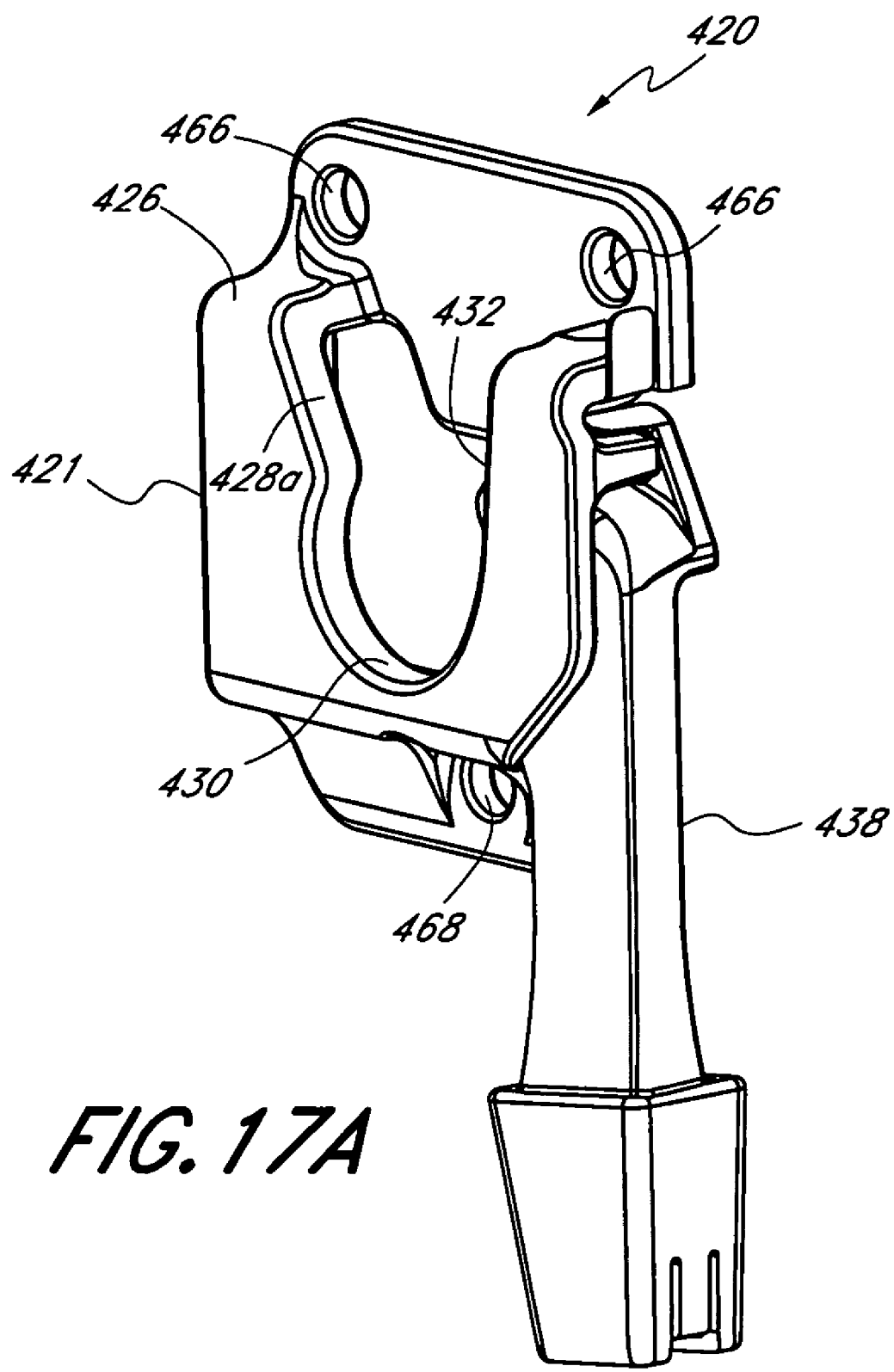
FIG. 17A is a perspective view of the mounting station of FIG. 16A.

As illustrated by FIGS. 16A and 17A, the mounting station 420 comprises a stationary portion 421 and a moveable portion or lever 438. In one embodiment, the stationary portion 421 comprises two upper screw holes 466 and one lower screw hole 468 for attachment to a vehicle as described with respect to other embodiments described herein. The stationary portion 421 further comprises upper surfaces 426, a stationary slanting portion 428a, a stationary cusp 429a, a lower curved portion 430, and a vertical portion 432. The dimensions, shaping, and configuration of the upper surfaces 426, the stationary slanting portion 428a, the stationary cusp 429a, and the lower curved portion 430 are substantially the same as the upper surfaces 126, the upper edge 124, the slanting porition 128, the cusp 129, and the lower curved portion 130 as disclosed herein with reference to FIGS. 9, 10, 16, and 17. A skilled artisan will appreciate, in light of this disclosure, that embodiments exist in which the dimensions, shaping, and configuration of the foregoing components are varied, while not departing from the principles of the invention or the scope of the invention disclosed herein.

Referring to FIG. 17B, the lower curved portion 430 is substantially circular in shape beginning at the stationary cusp 429a through approximately 260 degrees. At approximately 260 degrees from the stationary cusp 429a, the lower curved portion 430 extends substantially vertically toward and substantially perpendicular to the substantially horizontal upper surfaces 426. A skilled artisan will appreciate in light of the figures and this disclosure that the vertical portion 432 need not be perfectly aligned vertically nor perpendicular to the upper surfaces 426. While the lower curved portion 430 defines a circular shape through approximately 260 degrees only, the term "diameter" is used herein as a quantity of the lower curved portion 430, and refers to the diameter of an imaginary circle defined by extending the circular shape of the lower curved portion 430 through 360 degrees. In one embodiment, the stationary cusp 429a and the vertical portion 432 are spaced apart from each other a distance that is greater than this diameter. Such measurement of the distance between the stationary cusp 429a and the vertical portion 432 is taken from an inner tip of the stationary cusp 429a to an inner surface of the vertical portion 432 along a line parallel to the upper surfaces 426. A skilled artisan will appreciate in light of this disclosure that because the distance between the stationary cusp 429a and the vertical portion 432 is greater than the diameter of the lower curved portion 430, a circular object with a diameter just smaller than the diameter of the lower curved portion 430 is able to pass between the stationary cusp 429a and the vertical portion 432. Advantageously, the diameter of the axle portion 446 of the mount 440 is just smaller than the diameter of the lower curved portion 430, such that when the lever 438 is in the open position, the axle portion 446 can pass between the stationary cusp 429a and the vertical portion 432 and be received within the lower curved portion 430, but that when the lever 438 is in the closed position, the axle portion 446 is prevented from becoming disengaged from the lower curved portion 430.

As also illustrated by FIG. 17B, the moveable portion or lever 438 comprises a handle 439, a spring 441, a groove 436, a moveable slanted portion 428b, a moveable cusp or stop 429b, a lever cap 450, and a pivot 452. The pivot 452 connects the stationary portion 421 to the lever 438 and allows the lever 438 to rotate about the pivot 452. The groove 436 interacts with the guide pin 434 of the stationary portion 421 to define two positions, a closed position and an open position of the lever 438 with respect to the stationary portion 421. In a closed position, as illustrated by FIG. 22C, the moveable cusp 429b is positioned so as to provide a cusp that is symmetrical to and on an opposing side to the stationary cusp 429a. In this position, the lower curved portion 430 and the moveable cusp 429b cooperate to define a substantially circular shape beginning at the stationary cusp 429a through approximately 300 degrees. Accordingly, in this position, the distance between the stationary cusp 429a and the moveable cusp 429b is smaller than the distance between the stationary cusp 429a and the vertical portion 432. In this position, the moveable cusp 429b and the stationary cusp 429a cooperate to prevent the axle portion 446 of the mount 440 from passing between the stationary cusp 429a and the moveable cusp 429b. Accordingly, as illustrated, in this position the moveable cusp 429b and the stationary cusp 429a lock the bed extender into place such that it will not spontaneously become detached from the vehicle.

Figure 21B:
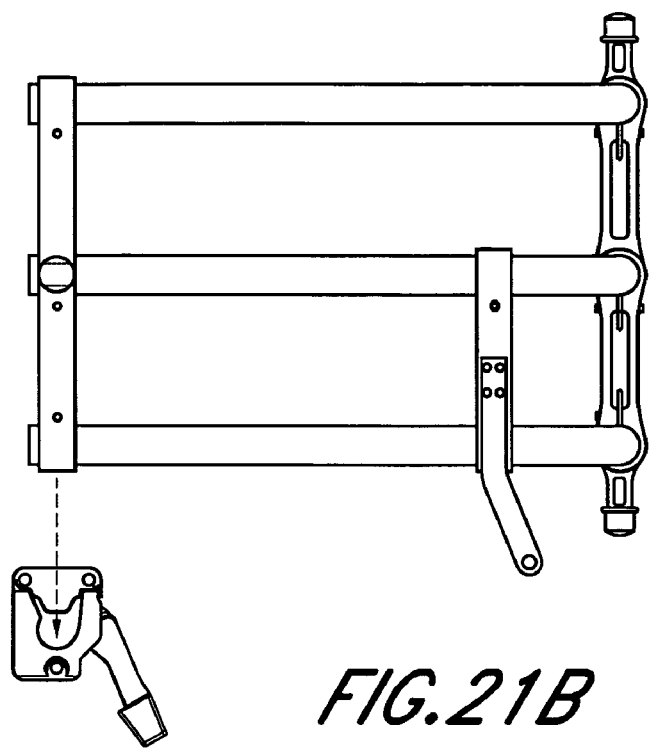
FIGS. 21B and 22B are schematic views illustrating the mounting of the extender using the alternative mounts and mounting stations of FIGS. 13A and 16A.
Figure 21C:
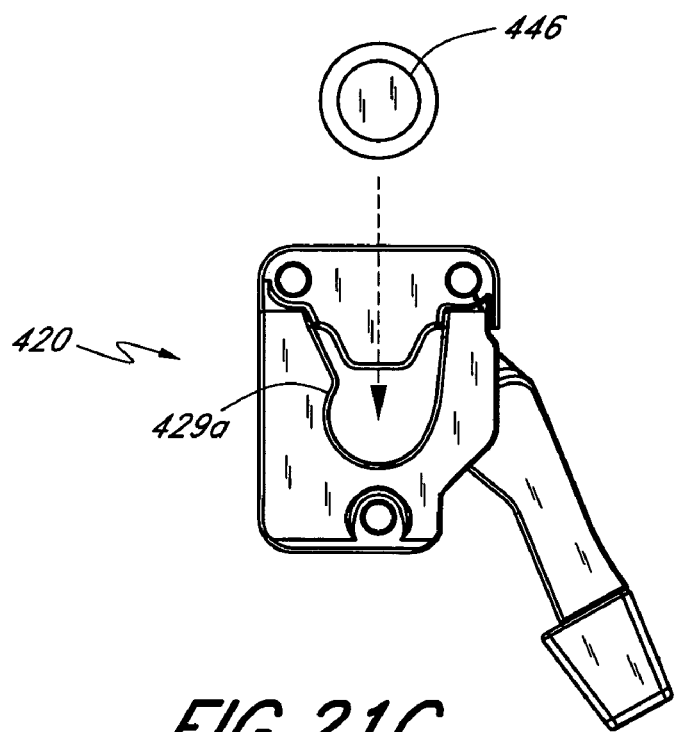
FIGS. 21C and 22C are corresponding schematic views illustrating the position of the mounting station and male member during the mounting of the extender using the alternative mounts and mounting stations of FIGS. 13A and 16A.

In an open position, as illustrated by FIG. 21C, the moveable cusp 429b is positioned such that the distance between the stationary cusp 429a and the moveable cusp 429b is greater than the diameter of the lower curved portion 430. Accordingly, in this position, the stationary cusp 429a and the moveable cusp 429b allow the axle portion 446 of the mount 440 to pass between the stationary cusp 429a and the moveable cusp 429b. In one embodiment, the moveable cusp 429b, in the open position, is positioned such that the distance between the stationary cusp 429a and the moveable cusp 429b is at least as great as the distance between the stationary cusp 429a and the vertical portion 432. Accordingly, in this position, the stationary cusp 429a and the vertical portion 432 allow the axle portion 446 to pass between the stationary cusp 429a and the vertical portion 432, as if the lever 438 were not even attached to the stationary portion 421.

Figure 22B:
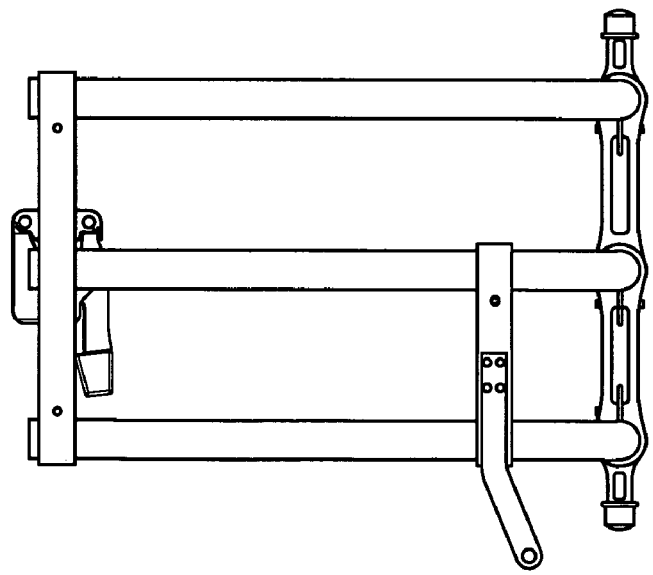
Figure 22C:
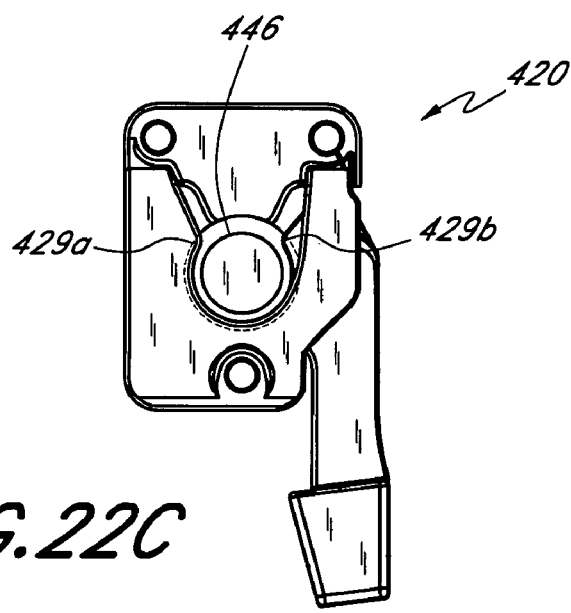

Referring to FIGS. 21B, 22B, 21C, and 22C, one method of mounting a bed extender to a vehicle is described. As illustrated by FIGS. 21B and 21C, a person readies the bed extender by aligning the mounts 440 with the mounting stations 420. The person operates the lever 438, moving the lever 438 to the open position. The person moves the mounts 440 downward such that the axle portions 446 engage the corresponding lower curved portions 430 of the mounting stations 420. As illustrated by FIGS. 22B and 22C, the person operates the lever 438 or allows the lever 438 to move to the closed position. Advantageously, with the lever 438 in the closed position, the bed extender is secured against movement and against spontaneously detaching from the vehicle. Advantageously, this embodiment of the mounts 440 and the mounting stations 420 allow the bed extender to be installed by aligning the bed extender in a horizontal position (e.g. with the bed extender extended over the tailgate or over the truck bed) and moving the bed extender straight down to be engaged in the horizontal position. Accordingly, this embodiment does not require installing the bed extender first in a vertical position and then rotating the bed extender into a horizontal position. A skilled artisan will appreciate, in light of this disclosure, however, that a person can install the bed extender first in a vertical position and then rotate it into a horizontal position, and there is no requirement that either method be used to the exclusion of the other.

Advantageously, the bed extender can be easily detached and dismounted from the vehicle by essentially reversing the foregoing actions. A person operates the lever 438 to move the lever 438 to the open position. The person moves the bed extender upward to disengage the axle portion 446 of the mount 440 from the mounting station 420. The person allows the lever 438 to return to the closed position while the axle portion 446 is disengaged from the mounting station 420.

Figure 17C:
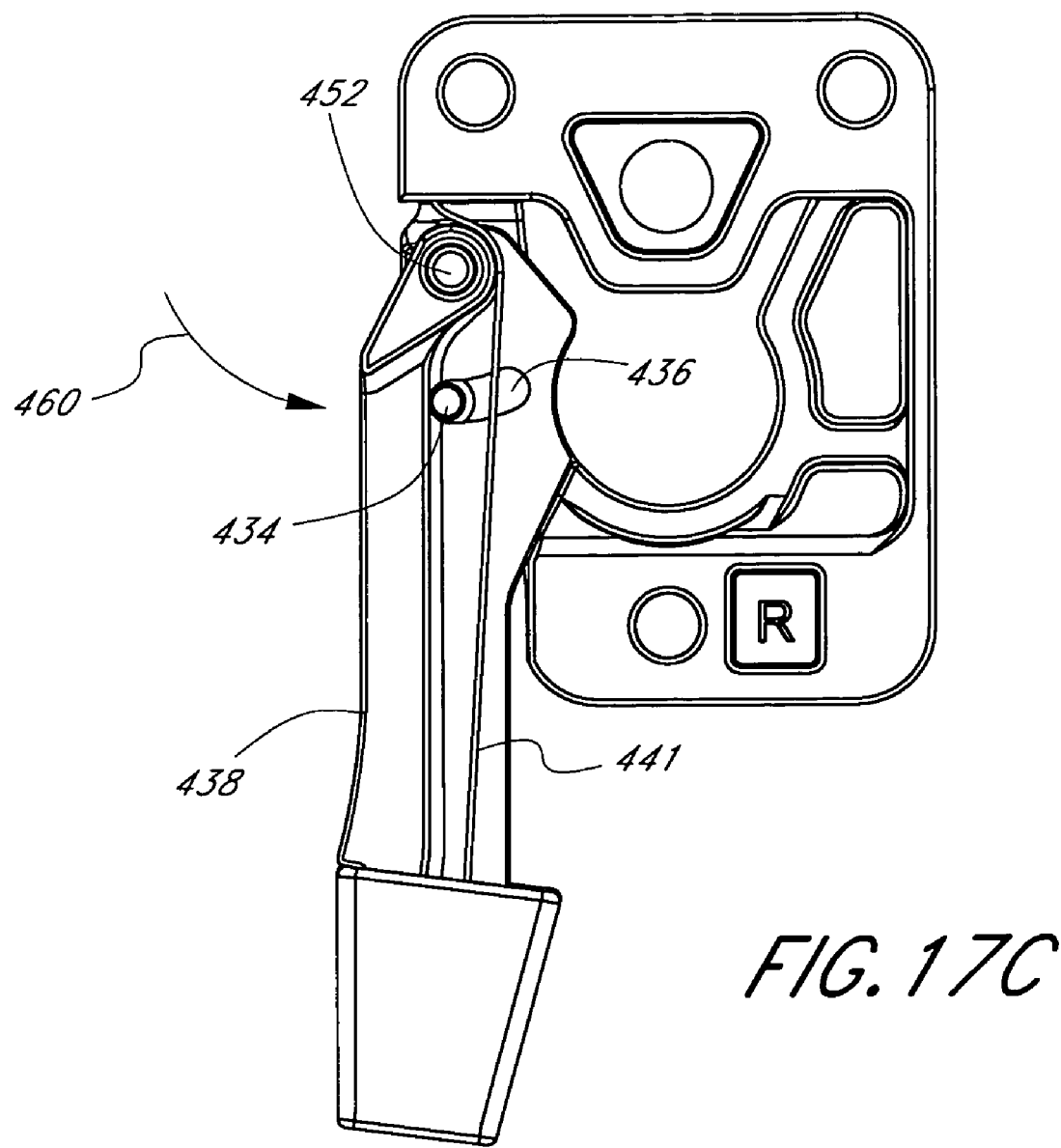
FIG. 17C is a rear elevational view of the mounting station of FIG. 17A.

Referring to FIG. 17C, the spring 441 biases the lever 438 to the closed position, such that the lever 438 assumes the closed position in the absence of external pressure, such as from manual movement of the lever 438. The lever 438 is configured such that a person can manually move the lever 438 to the open position. Advantageously, however, the lever 438 cannot easily be moved to an open position by random external forces, such as, for example, typical shocks caused by driving over uneven terrain. For example, the lever 438 is designed not to move to the open position in the event that a shock causes the axle portion 446 of the mount 440 to contact and exert a force upon the moveable cusp 429b. Instead, a force directed toward the upper surfaces 426 causes the lever 438 to attempt to rotate about a pivot 452 in the direction of the arrow 460. As illustrated, however, the guide pin 434 interacts with the groove 436 to prevent such rotation, holding the moveable cusp 429b in its closed position. Furthermore, because the spring 441 tends to hold the lever 438 in its closed position, common random external forces that may be exerted on the lever 438 that would cause the lever to rotate in a direction opposite to the arrow 460 are generally not large enough to overcome the spring 441 and move the lever 438 into an open position. Advantageously, therefore, accidental detachment of the bed extender from the vehicle is unlikely.

Figure 18:
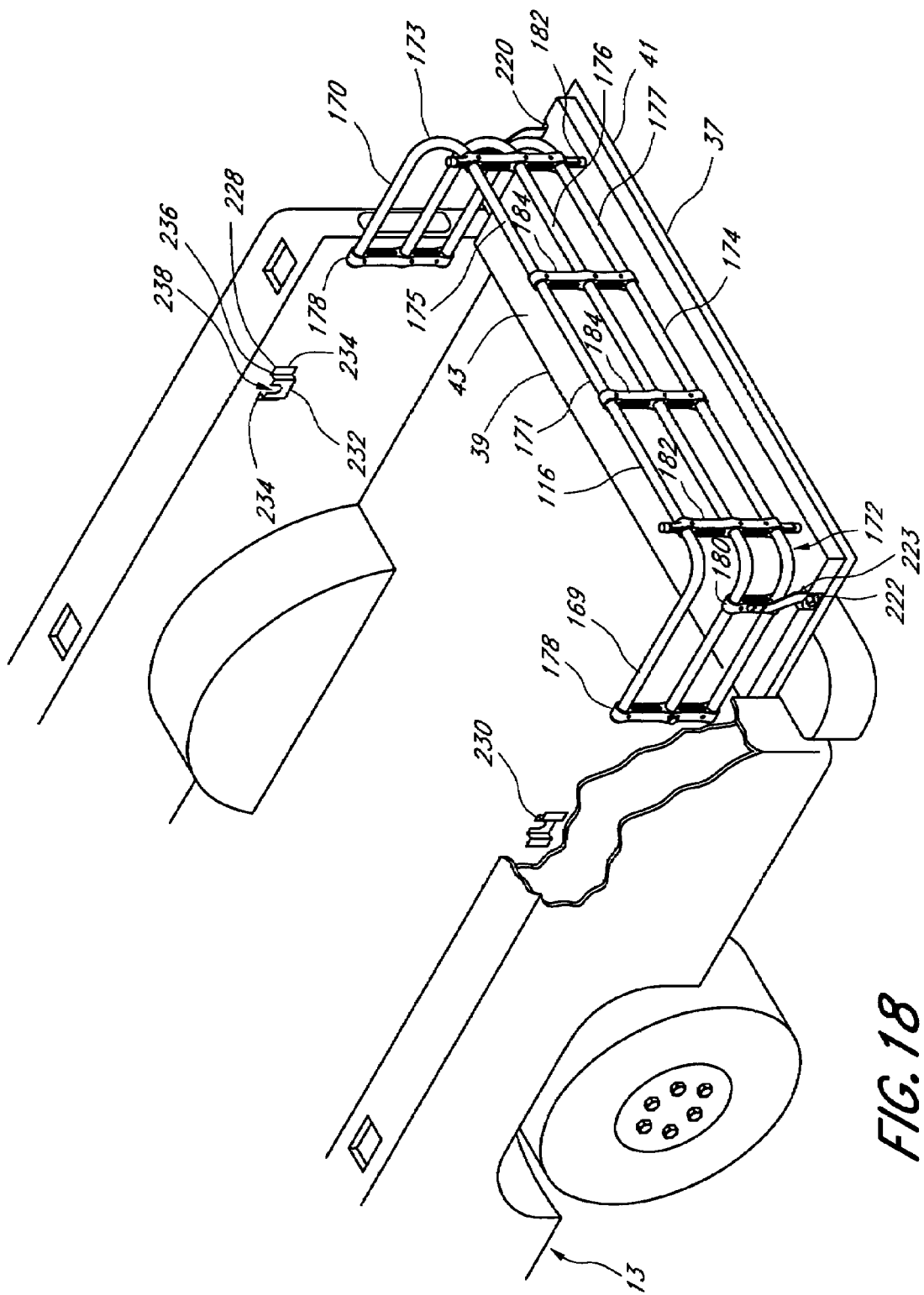
FIG. 18 is a enlarged partial perspective view of a vehicle and alternative bed extender.

Referring to FIG. 18, an alternative vehicle bed extender 11b is shown mounted to a truck 13 having a tailgate 37 including a hinge end 39 and a distal end 41 and defining an inner surface 43. The bed extender includes a first side wall 169, a second side wall 170, and a connecting wall 171. As with the extender 11 discussed above, the walls are formed by a first L-shaped section 172 and a second L-shaped section 173 connected by a plurality of straight connecting sections 174. As in the extender 11 of FIG. 1, the sections are formed from L-shaped and straight pieces of tubing. Specifically, each L-shaped section includes a first cross beam 175, a second cross beam 176 and a third cross beam 177. The cross beams and the straight sections 174 are connected by elongate vertical plastic struts. Significantly, the bed extender 11b is shown with a first and a second locking strut which is a combination mount and strut and 78, as previously described in connection with FIG. 13. The extender 11b also includes a first and second latching strut 180 which is a combination interlock and strut, a first and second bumper strut 182 which is a combination bumper and strut, and a first and second simple strut 184. The struts 178, 180, 182 and 184 each define cylindrical openings for receiving the tubular cross beams. The struts 178, 182 and 184 are clamped tightly around the cross beams by means of first, second, and third fasteners 186, 188, and 190, respectively. The first and second latch struts 180 define only two horizontal bores and are secured to only the lower (when the truck bed extender is mounted over the tailgate) two cross members. Each latch strut 180, or connector, defines an outer side 196 defining a mounting surface to which is secured a interlock 200 defining an arm portion 202 and an interlock portion 204. In the embodiment illustrated in FIGS. 18-25, the interlock portion 204 forms a cylinder. Significantly, the latch struts 180 and, therefore, the interlock portion 204 is movable toward the front and rear of the tailgate to ensure proper positioning with respect to the existing tailgate locking mechanism.

The bumper strut 182 includes a first post 210 extending beyond the upper cross beam 175, which is provided with a first resilient bumper 212 and a second post 214 extending below the lower cross member 177, which is provided with a second bumper 216.

Referring to FIG. 20, it will be appreciated that the simple struts 184 are positioned so as to cover the seam 218 between the L-shaped cross beams and the straight connecting sections.

As illustrated in FIG. 18 and 21-25, the tailgate is provided with a first and second lock mechanism. As both lock mechanisms are mirror images of one another, only the second lock mechanism 222 need be described. The second lock mechanism 222 is positioned within a notch 223 in the tailgate. The lock mechanism 222 includes an interlock portion 224, which is controlled by a release actuator 226. As well known by those of skill in the art, the release actuator 226 typically operates both the first and the second lock mechanisms. Importantly, the locking mechanism described is a standard lock mechanism used on the vehicles to releasably secure the tailgate in an upright position. Thus, no customized lock mechanism is required.

Referring again to FIG. 18, a first holder 228 is mounted to the inner surface of the first upstanding panel 25 and a second holder 230 is mounted to the inner surface of the second upstanding panel 27. As the first holder 228 and second holder 230 are identical, only the first holder 228 will be described. The first holder 228 has a body 232 which is straddled by a pair of L-shaped flanges 234, which are used to space the body 232 from the inner surface of the panel 25 and to provide a surface to mount the holder 228 to the panel 25. The holder defines an upper edge 236, which in turn defines a U-shaped slot 238 having an upper open end and a lower closed end. The purpose of the holders 228 and 230 will be described in detail below. Referring now to FIGS. 21 and 21a, the bed extender 11b is shown disconnected from the truck 13. The bed extender 116 is positioned with the connecting wall 171 being horizontal, the open ends of the extender 116 extending downward and the male members of the locking struts 178 being aligned in a vertical plane with the aperture of the bracket 120. Advantageously, the truck bed extender can be easily aligned in this manner by a single person by grasping the bed extender in two locations spaced on either side of the center of gravity of the bed extender. As shown by the arrows in FIGS. 21 and 22, the bed extender is then simply lowered vertically downward until the axle portion fits between the cusps 129 of the bracket 120. Similarly, the locking portion fits into the wide opening defined by the horizontal upper surfaces 126.

When the truck bed extender reaches the position shown in FIGS. 22 and 22a, the extender 11b can be rotated outward or inward approximately 90E. The curved sides 152 of the axle portions 146 mate with and journal within the curved portion of the bracket 120. When thus rotated, the cusps prevent the axles 146 from lifting out of the brackets 120, as will be understood by one of skill in the art.

FIGS. 23 and 23a show the truck bed extender rotated approximately 60E outward so that the axle portion is secured by the bracket 120.

As will be appreciated by FIGS. 23 and 24, as the bed extender 11b rotates downward, portion 204 of the second interlock 200 is received and retained by the interlock portion 224 of the second lock mechanism 222 of the tailgate. Significantly, the vehicle bed extender is configured such that the only portions of the bed extender 11b in contact with the tailgate 37 are the interlocks 200. That is, as best seen in FIG. 24, when the bed extender is latched to the tailgate with the connecting wall in an upright position, the side walls 169, 170 and the connecting wall 171 are spaced above the tailgate 37. The bumper struts 182 are provided with bumpers only for purposes of cushioning any contact between the connecting wall and the tailgate, in the event the tailgate is jarred such as when the vehicle strikes a speed bump at excessive speed. This positioning of the side walls and connecting walls above the tailgate prevents undesired vibration and rattling.

Figure 26:
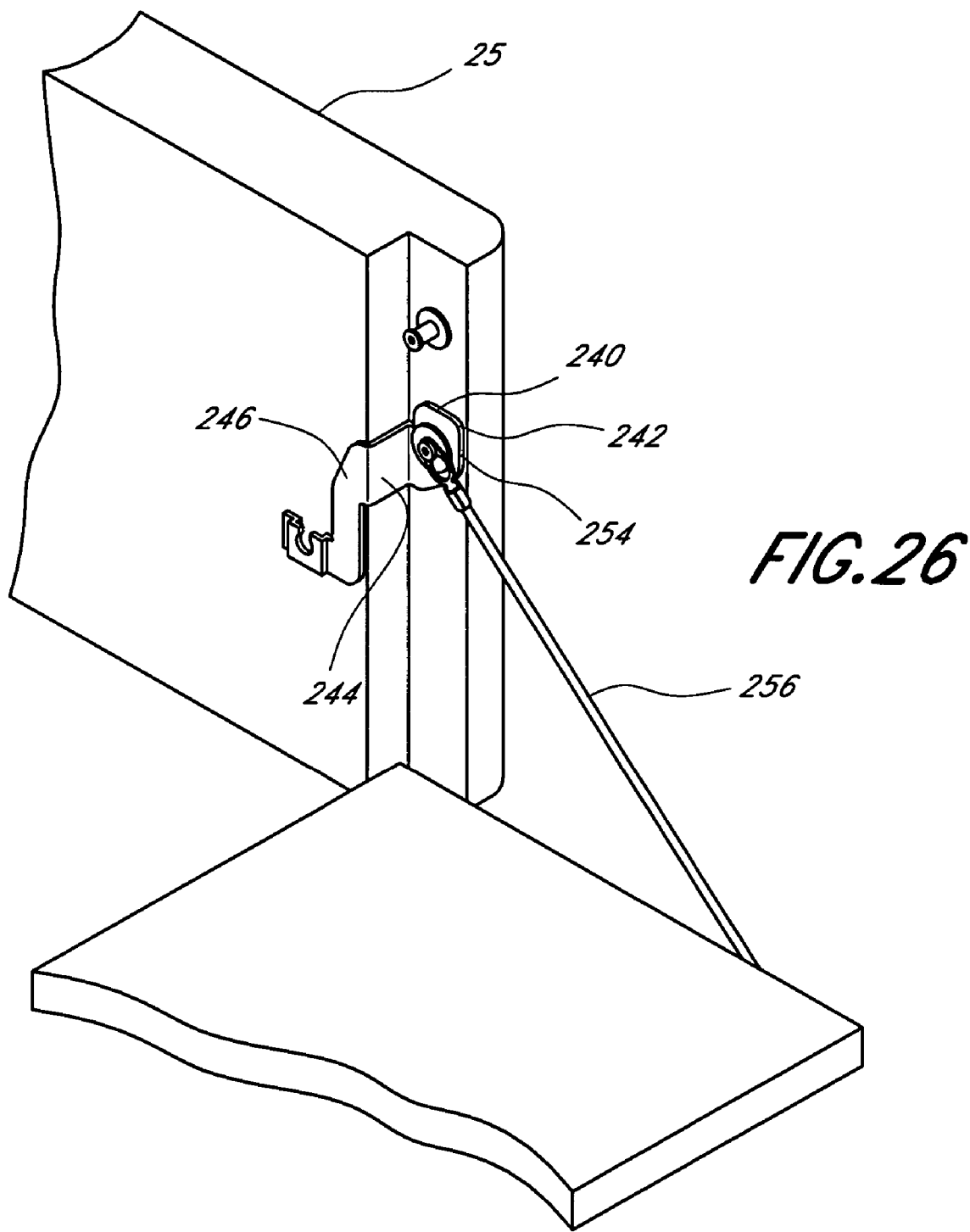
FIG. 26 illustrates an alternative mount, which avoids the need for drilling of additional holes in the vehicle.

When it is desired to close the tailgate, it is a simple matter to actuate the release actuator 226, thereby releasing the interlock portions 204 permitting the extender 11b to be rotated upward away from the tailgate about the pivot axis defined by the brackets 120 either to (1) a position where the connecting wall is parallel to the truck bed, so that the truck bed extender can be removed, by lifting it upward in the direction opposite to the arrow shown in FIG. 21, or (2) a position shown in FIGS. 25 and 25a, where the interlock portion 204 of the bed extender is secured within the slot 238 of the holder 230. Again, as the bed extender is secured by the holders 228 and 230 above the vehicle bed, vibration and rattling is minimized. As shown in FIG. 25, in this position, the tailgate can be closed and latched in the usual manner. Referring now to FIG. 26, an alternative bracket 240 is illustrated. Significantly, the bracket 240 can be mounted on the vehicle solely through the use of an existing fastener 254 used to secure a tailgate safety cable 256 to the side panel 25 of the truck. The first bracket 240 includes a first section 242 extending parallel to the length of the truck, a second section 244 extending perpendicular to the first section and a third section 246 extending parallel to the first section and perpendicular to the second section. The first section 242 defines a connector hole 250 for receiving the fastener 254 used to mount the inner end of the tailgate safety cable 256 to the panel.

Advantageously, due to the configuration of the first bracket 240, no additional fasteners are required to securely mount the bracket 240 to the vehicle. Significantly, the sections cooperate to prevent the rotation of the bracket about the axis of the connector hole 250 when the bracket 240 is mounted on the vehicle.

Figure 27B:
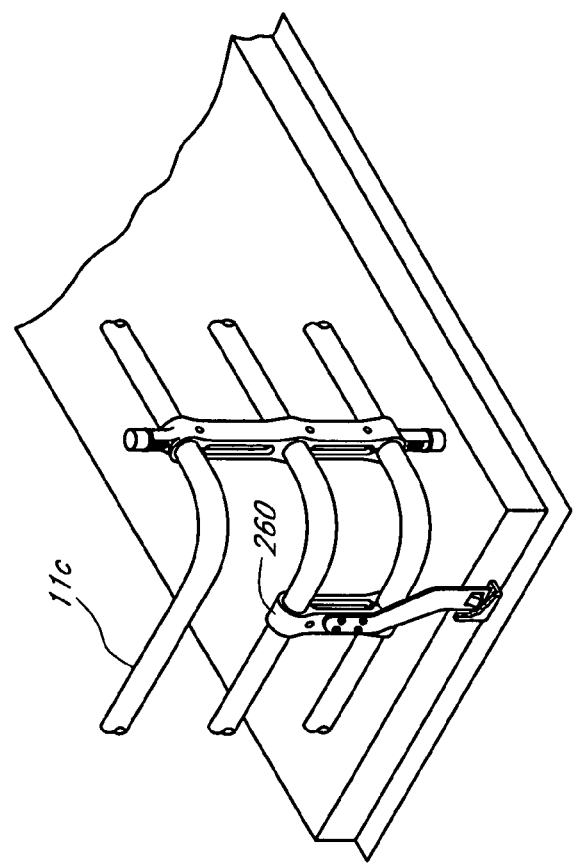
FIGS. 27*a*-27*b* illustrate an alternative connector having a buckle configuration.
Figure 27A:
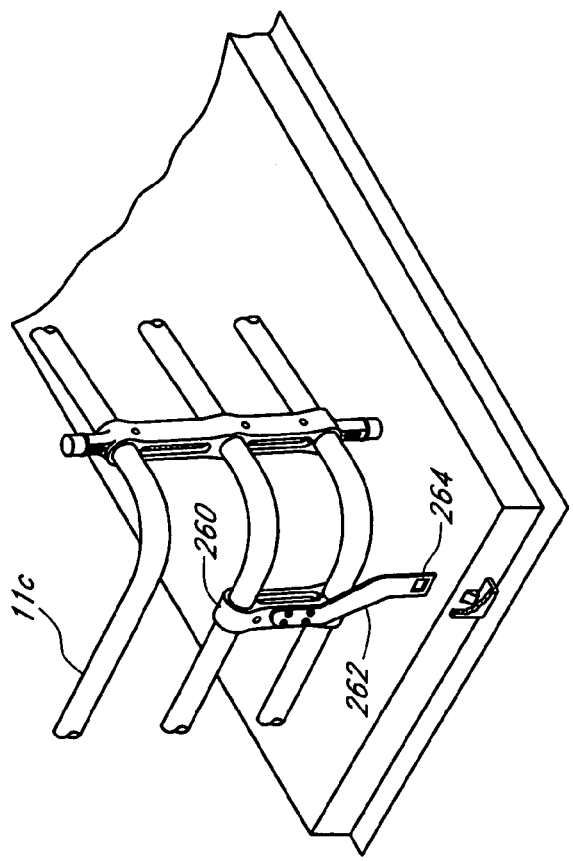

FIGS. 27a and 27b illustrate an alternative bed extender 11c having a latching strut 260 including an interlock arm 262 having an interlock portion 264 defining a buckle arrangement. This interlock is used in connection with the other major form of standard tailgate locking mechanism, well known to those of skill in the art. Advantageously, the interlock portion 264 provides the only contact between the extender 11c and the tailgate, thereby minimizing vibration and rattling.

FIGS. 28-33 illustrate an alternative connector 270 adapted to be secured to only the lower crossbeam of a bed extender 11d. The connector 270 includes a bracket 271 and an interlock having an arm 272 and an interlock portion 274. The bracket 271 includes a base 276 and a clamp 278 secured to the base by fasteners. As with the latch struts 180, 260 described above, the connector has the advantage of being movable toward the front and rear of the tailgate to ensure proper positioning with respect to the existing tailgate latch mechanism.

FIGS. 34-37 illustrate holders 280, 282 mountable to the inner surface of the side panels to mate with and retain the interlock portion of a connector, such as the latch strut 180.

FIGS. 38-41 illustrate an alternative bracket 290 and an alternative combination first and second interlock and strut 300 which operates in the same general manner as the bracket and combination interlock and strut illustrated in FIGS. 18-26, with the notable exceptions that the holder is integrally formed with the mount and strut, and the holder is provided with a lock mechanism, as will be described in detail below.

Figures 38, 39:
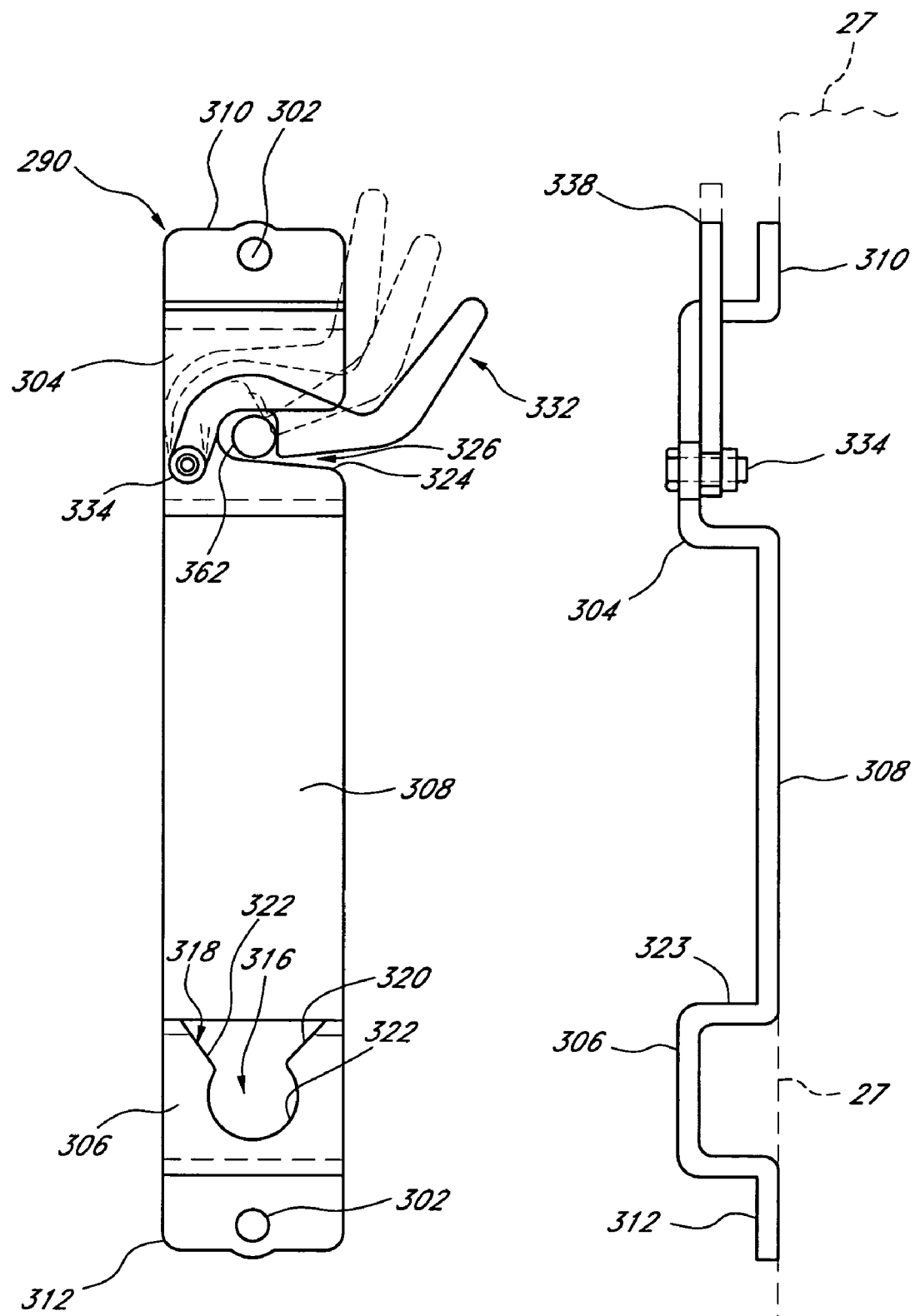
FIGS. 38-41 illustrate an alternative bracket and combination mount, strut and interlock.

Referring now to FIGS. 38 and 39, the elongate bracket 290 is provided with a screwhole 302 at each end. The bracket includes an upper raised holder portion 304 and a lower raised station portion 306. The upper holder portion 304 and lower station portion 306 are separated by spacing flange 308. An upper mounting flange 310 which defines the upper screwhole 302 is provided above the upper holder portion 304. A lower mounting flange 312 defining the lower screwhole 302 is provided below the lower station portion 306.

The lower station portion 306 forms an aperture 316 defined by an upper edge 318. The upper edge 318 includes an arcuate portion 320 which defines a pivot surface and a pair of slanted portions 322 which define a pair of guiding surfaces. As in prior designs, the upper spacing wall 323 of the lower station portion 306 defines an opening for receiving the larger end portion of a male member, as will be described below.

The upper holder portion 304 is similarly spaced outward from the flanges 308, 310 and 312. The upper holder portion 304 includes an edge 324 which defines a U-shaped slot 326 having an open end 328 and a closed end 330. A latch 332 is mounted to the upper holder portion 304 by pivot pin 334.

Figure 40:
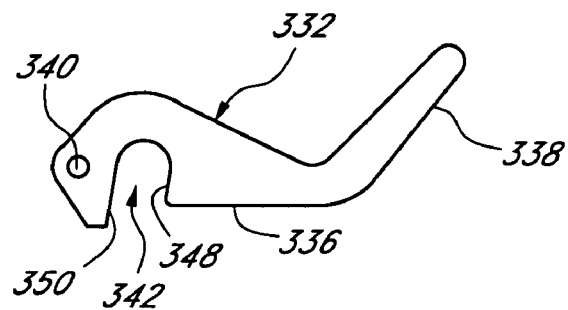

As best seen in FIG. 40, the latch 332 has a generally C-shaped body 336 and a release arm or lever 338. The body 336 further defines a mounting hole 340 opposite the release arm 338. Between the release arm 338 and the mounting hole 340 is a generally U-shaped slot 342 including an open end and a closed end. The slot is formed by an edge which defines a locking surface 348 and an engagement surface 350.

Figure 41:
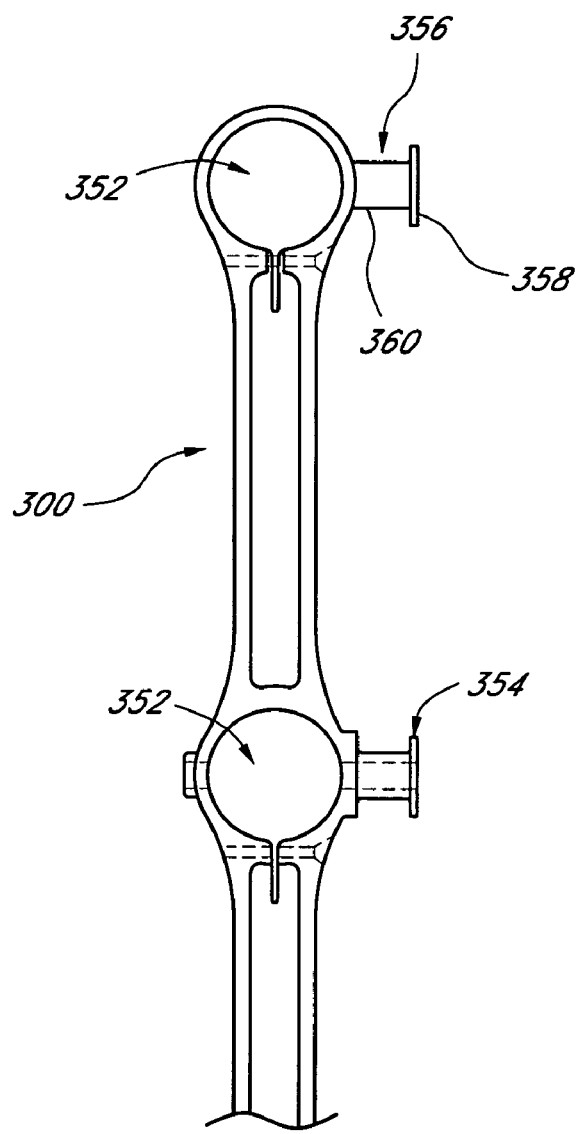
Figure 42:
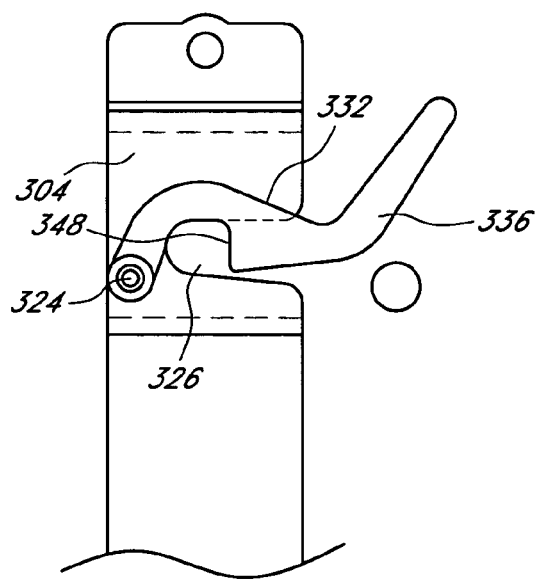
FIGS. 42-45 are corresponding schematic views of the bracket, upper holder, latch and interlock of FIG. 38.

Referring now to FIG. 41, the combination first and second interlock and strut 300 will now be described. The combination first and second interlock and strut 300 has the same general configuration as the combination interlock and strut 140a illustrated in FIG. 13, with certain exceptions. Specifically, the strut 300 includes three openings 352 to receive the cross beams, and includes a first male member 354 similar to the male element 144 previously described in connection with FIG. 12. The combination first and second interlock and strut 300 differs from the combination interlock and strut of FIGS. 13-14 in that it includes a second male member 356 extending from near the upper end of the combination first and second interlock and strut. The second male member 356 includes a larger disc-shaped outer end portion 358 and a smaller cylindrical middle portion 360. The middle portion 360 defines a cylindrical engagement surface 362.

A truck bed extender utilizing the combination first and second interlock and strut 300 and the bracket 290 is operated in a manner very similar to that previously described in connection with the extender, bracket and holder of FIGS. 18-26. As will be appreciated by one of skill in the art, however, the bracket 290 is mounted on the inside vertical surface of one of the upright panels of the vehicle, such as second panel 27, so that the lower station portion is positioned in the same location as the station portion of the bracket 120. Advantageously, because the upper holder portion and lower station portion are formed as a single piece, the holder portion need not be separately positioned and mounted.

Figure 43:
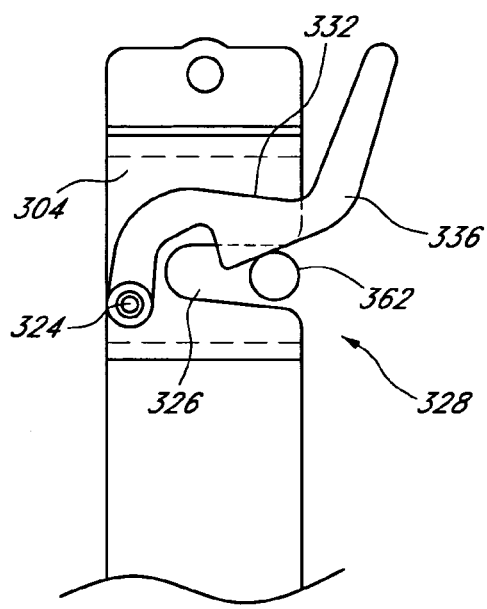
Figure 44:
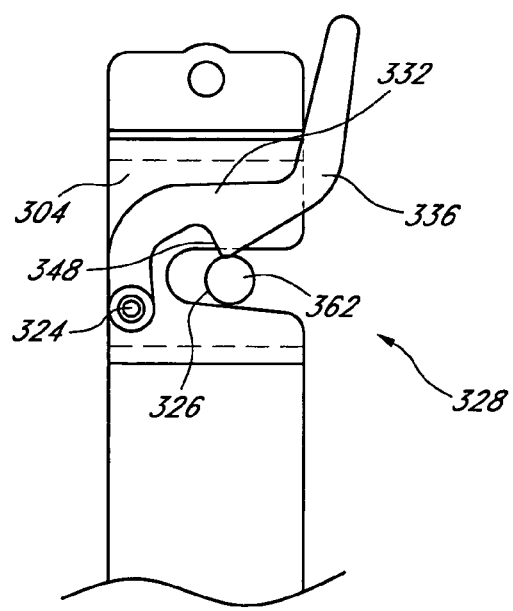
Figure 45:
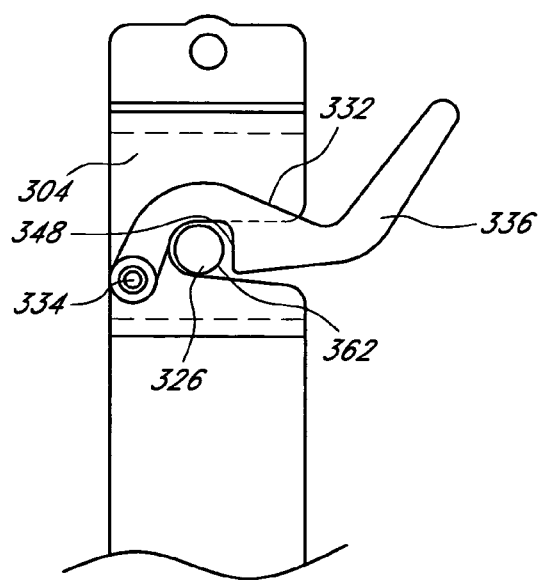

Another advantage of this design is illustrated in FIGS. 42-45, which show an enlarged view of that which has already been described in FIG. 38. When the truck bed extender is rotated to the position shown in FIG. 24, in addition to being locked against radial movement about the pivot axis by the lower station portion 306 as shown in FIG. 38, the cylindrical engagement surface 362 of the smaller middle portion 360 of the second male member 356, seen in FIG. 38, enters into the open end 328 of the U-shaped slot 326 and presses against the body 336 of the latch 332. This causes the latch 332 to rotate about the pivot pin 334 as seen in FIGS. 43 and 44 and in phantom in FIG. 38 until the cylindrical engagement surface is locked in place by the latch 332, as illustrated in FIG. 45. Specifically, the locking surface 348 of the body 336 of the latch 332 prevents the cylindrical engagement surface 362 of the second male member 356, as seen in FIG. 38, from being removed through the open end 328 of the slot 326 of the upper holder portion 304.

When it is desired to release the lock and rotate the truck bed extender so that it is in the position shown in FIG. 25, the release arm 338 of the latch 332 is pushed toward the upper holder portion 304 which, due to its configuration, causes the latch 332 to pivot about the pivot pin 334 as shown in phantom in FIG. 38. Advantageously, the release of this lock member can be achieved through the use of a single finger.

As will be appreciated, this arrangement provides a number of significant advantages. As discussed above, the use of a single piece to define both the holder and station avoid the need for a separate positioning and mounting operation. Further, the use of a separate lock avoids potential wear and tear on the tailgate latch mechanism. Importantly, the automatic nature of the lock ensures that when the truck bed extender is rotated into position over the tailgate, with the connecting wall in a vertical position, the truck bed extender will be locked in place automatically. This essentially eliminates the need for the user to remember to lock the extender into position over the tailgate. Advantageously, the connecting wall of the truck bed extender is locked so as to be spaced above the tailgate avoiding vibration. At the same time, because the extender locks into position, the truck bed extender secures the tailgate against significant upward movement in the event the vehicle rides over a large bump.

Again, the particular arrangement is particularly desirable in that only one combination first and second interlock and strut 300 need be used to lock the bed extender in place. The other side can utilize the standard mounting bracket 120. This is desirable not only from an assembly and cost standpoint, but also facilitates the unlocking of the extender. In this regard, it is further significant that the lock mechanism utilized does not need to be retracted to avoid damage to the side panel of a vehicle during the locking operation.

Figure 46:
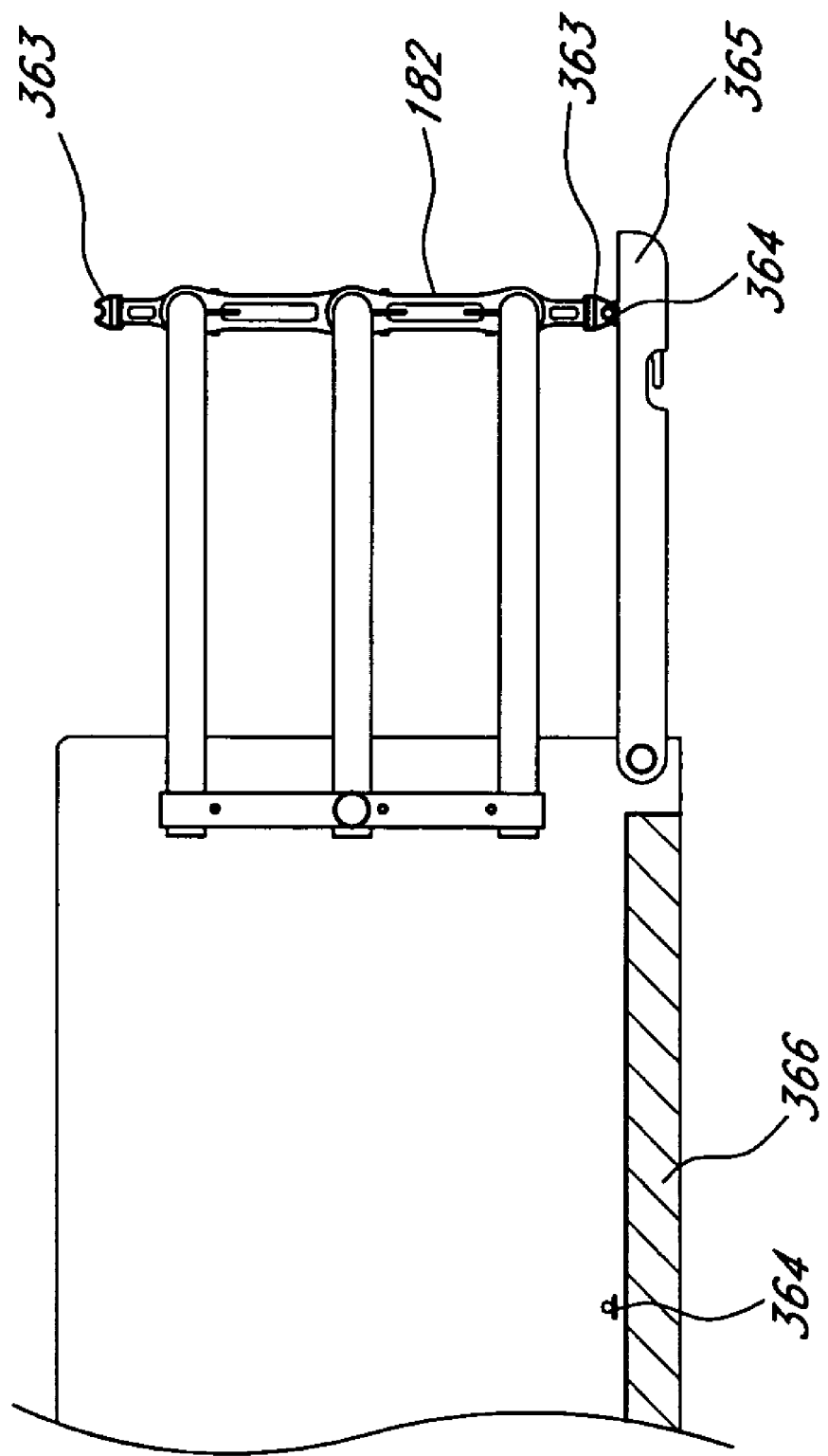
FIGS. 46 and 47 illustrate the mounting of the extender of FIG. 18 using an alternative fastener.
Figure 47:
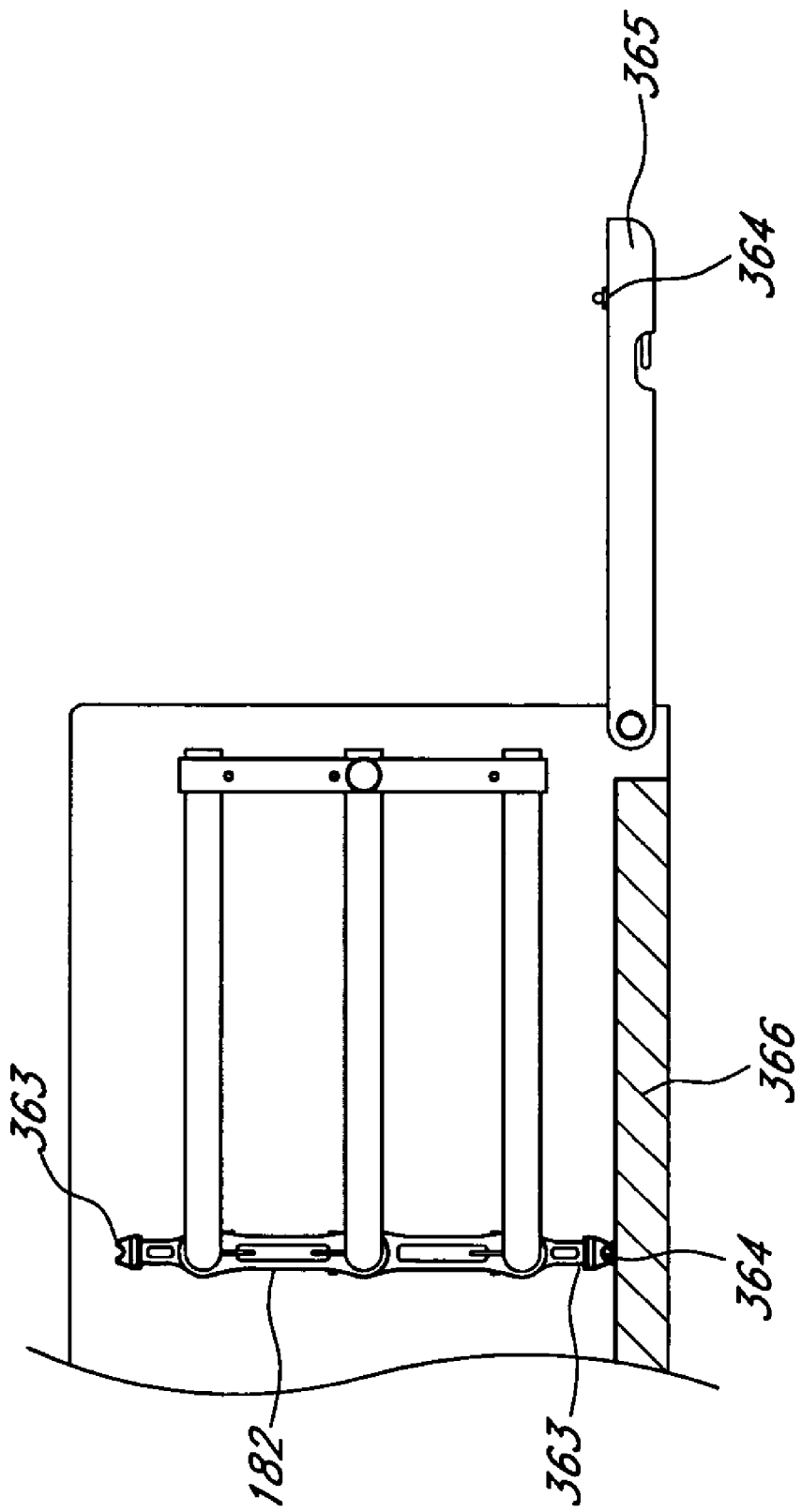

FIGS. 46-51 illustrate an alternative lock consisting of a first and second interlock for securing the extender to the tailgate or bed of the truck. As shown in FIG. 46, the first interlock portion or clamp 363 is affixed to the bumper strut 182. The clamp 363 connects to the second interlock portion or latch or bar 364, which is attached to distal end of the tailgate 365 when the extender is in position over the tailgate, as illustrated in FIG. 46. A third interlock portion 364, identical to the second interlock portion, may also be attached to the bed of the truck 366 when the extender is used to form a rear storage compartment as in FIG. 47.

Figure 48:
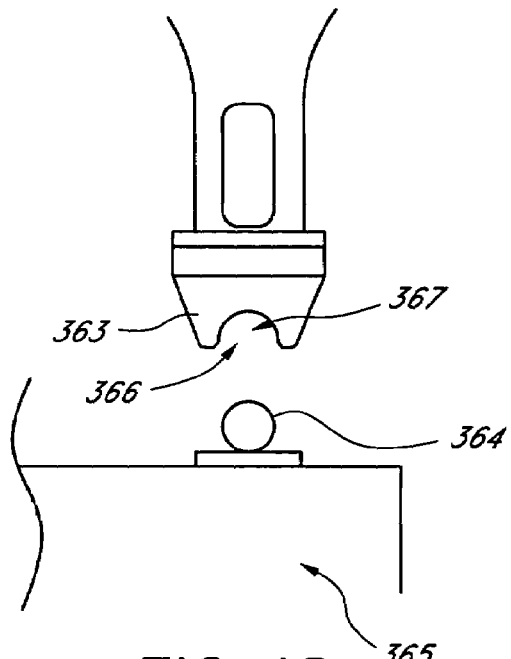
FIGS. 48-50 illustrate the alternative fastener of FIGS. 46 and 47.

FIG. 48 included an enlarged view of the clamp 363. The clamp 363 has an opening 366 to accommodate the bar 364. The opening 366 in the clamp 363 includes a first portion 368 forming a narrow opening and a second portion 367 defining a slot sizable enough to accommodate the bar 364. The clamp 363 is preferably made of a resilient material so that the first portion 368 can expand to allow the bar 364 to enter the receiver slot 367 defined by the second portion. Thus some force must be applied to connect the clamp 363 to the bar 364.

Figure 49:
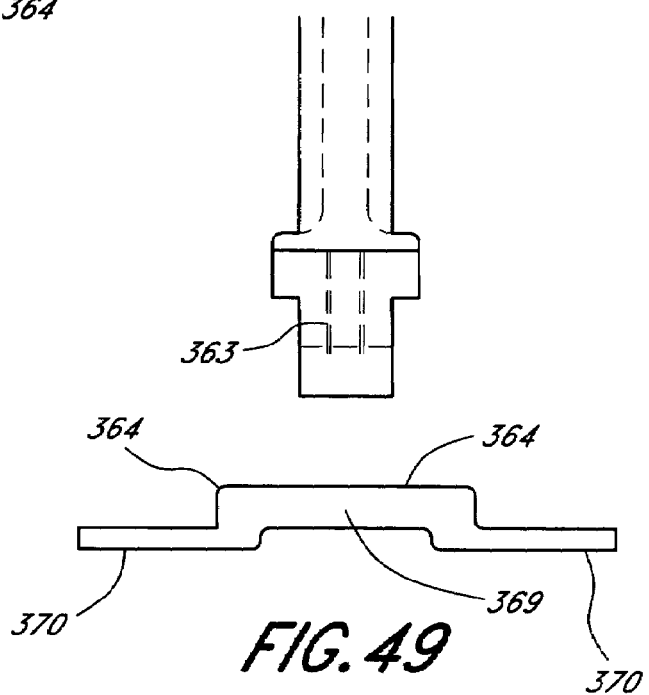
Figure 50:
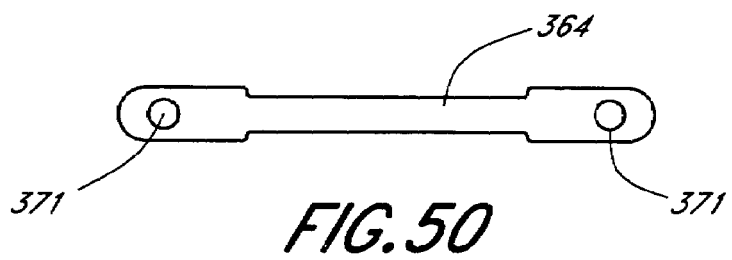

FIG. 49 is a perspective view of the clamp 363 and the bar 364. As can be seen, the bar consists of two flat mounting portions 370 that will serve as the attachment points to the tailgate or bed of the truck and a raised portion 369 to which the clamp 363 attaches. FIG. 50 shows that the bar 364 has two holes 371 which allow the bar 364 to be screwed or bolted to a surface.

Advantageously, the alternative first 363 and second 364 interlock allow the extender to be secured while in use. This reduces unwanted vibration or noise and should prevent unwanted movement of the extender. Importantly, the extender can be simply secured using this lock by simply pressing down on the extender when it is in position. Similarly, pushing up on the extender will release the fastener.

While the invention has been described with reference to certain preferred embodiments, many variations are possible and those of skill in the art will appreciate various modifications within the scope and spirit of the invention.

What is claimed is:

1. A vehicle bed extender for use with a vehicle having an open storage bed having a rear end, a first upstanding side panel to one side of said bed having an inner side, a second upstanding side panel to an opposite side of said bed having an inner side and a tailgate, said extender comprising:
   a first side wall;
   a second side wall;
   a connecting wall extending between said first side wall and said second side wall, said first side wall, said second side wall and said connecting wall cooperating to form a generally U-shaped frame having a first open side and a second open side;
   a first mount comprising a first interlocking portion;
   a first mounting station configured to be fixed with respect to one of said first upstanding side panel and said second upstanding side panel and to engage said first interlocking portion, said first mounting station comprising a first stationary portion and a first moveable portion, wherein said first moveable portion comprises a first stop configured to prevent said first interlocking portion from disengaging from said first mounting station when said first moveable portion is in a first position;
   a second mount comprising a second interlocking portion; and
   a second mounting station configured to be fixed with respect to the other of said first upstanding side panel and said second upstanding side panel and to engage said second interlocking portion, said second mounting station comprising a second stationary portion and a second moveable portion, wherein said second moveable portion comprises a second stop configured to prevent said second interlocking portion from disengaging from said second mounting station when said first moveable portion is in a first position;
   wherein said first mount, said first mounting station, said second mount, and said second mounting station cooperate to secure said extender to said vehicle so that, when said first moveable portion is in its first position and said second moveable portion is in its first position, said extender is positionable in either a first upright position over said tailgate rearward of said rear end of said bed with said first open side facing away from said tailgate and said second open side facing toward said tailgate with said connecting wall in a substantially vertical alignment or a second upright position over said rear end of said bed forward of said tailgate with said connecting wall in a substantially vertical alignment, and said extender provides access from above to a space between said first side wall and said second side wall.

2. The vehicle bed extender of claim 1, wherein said first moveable portion of said first mounting station is biased toward said first position such that said first moveable portion assumes said first position in the absence of external pressure and said second moveable portion of said second mounting station is biased toward said first position such that said second moveable portion assumes said first position in the absence of external pressure.

3. The vehicle bed extender of claim 2, wherein said first moveable portion is moveable from said first position by a first application of manual pressure to a second position in which said first stop is positioned to allow said first interlocking portion to disengage from said first mounting station, said first moveable portion returning to said first position upon release of said first application of manual pressure and said second moveable portion is moveable from said first position by a second application of manual pressure to a second position in which said second stop is positioned to allow said second interlocking portion to disengage from said second mounting station, said second moveable portion returning to said first position upon release of said second application of manual pressure.

4. The vehicle bed extender of claim 2, wherein the biasing of said first moveable portion is caused by a first spring and the biasing of said second moveable portion is caused by a second spring.

5. The vehicle bed extender of claim 3, wherein said first moveable portion and said second moveable portion are configured to resist movement toward said second position when said bed extender moves so as to bring at least a portion of said bed extender into contact with said first stop or said second stop, thereby resisting disengagement of said first interlocking portion from said first mounting station and disengagement of said second interlocking portion from said second mounting station.

6. A vehicle bed extender mounting station configured to be fixed with respect to a first upstanding side panel or a second upstanding side panel on a vehicle having an open storage bed having a rear end, said first upstanding side panel, said second upstanding side panel to an opposite side of said bed and a tailgate, said mounting station comprising:
 a stationary portion configured to be attached to said first upstanding side panel or said second upstanding side panel so as to fix said mounting station with respect to said first upstanding side panel or said second upstanding side panel; and
 a moveable portion attached to said stationary portion and moveable with respect to said stationary portion said moveable portion comprising a handle and a stop and biased toward a first position in which said stop and said stationary portion cooperate to engage an interlocking portion of a mount of said vehicle bed extender so as to secure said vehicle bed extender against detachment from said mounting station while allowing said vehicle bed extender to move from a first position over said tailgate rearward of said bed to a second position over said bed forward of said tailgate, said moveable portion further configured to assume, upon a manual application of pressure to said handle, a second position in which said interlocking portion can be disengaged from said mounting station so as to allow said vehicle bed extender to be detached from said mounting station, said moveable portion returning to said first position upon release of said application of manual pressure, said moveable portion configured to experience a force tending to maintain said moveable portion in said first position when said interlocking portion comes into contact with said stop such that said moveable portion and said stationary portion cooperate to resist detachment of said vehicle bed extender as a result of a movement of said interlocking member without a concurrent application of manual pressure to said handle.

7. The vehicle bed extender mounting station of claim 6, wherein the cooperation of said moveable portion and said stationary portion to resist detachment of said vehicle bed extender is such that movement of said bed extender so as to exert an upward force on said mounting station exerts a closing force on said moveable portion such that said moveable portion assumes said first position.

8. The vehicle bed extender mounting station of claim 6, further comprising a pivot located such that an upward force exerted by movement of said bed extender causes a rotational force which exerts a closing force on said moveable portion such that said moveable portion assumes said first position.

9. The vehicle bed extender mounting station of claim 6, wherein said stationary portion further comprises a stationary cusp, a lower curved portion, and a vertical portion, said stationary cusp, said lower curved portion, and said stop cooperating to define a circle through about 300 degrees when said moveable portion is in said first position, wherein said interlocking portion is substantially circular in shape and has an outer diameter that is just smaller than the inner diameter of the circle defined by said stationary cusp, said lower curved portion, and said stop, and wherein a maximum distance between said vertical portion and said stationary cusp is larger than said outer diameter such that when said moveable portion is in said second position said interlocking portion can pass between said stationary cusp and said vertical wall without such passage being impaired by said stop.

10. The vehicle bed extender mounting station of claim 7, wherein said moveable portion further comprises a spring and wherein said stationary portion and said moveable portion are attached at a pivot, wherein rotation of said moveable portion about said pivot in a first direction causes said moveable portion to assume said first position and wherein rotation about said pivot in a second direction opposite to said first direction causes said moveable portion to assume said second position, and wherein said spring is configured to resist any forces exerted on said stop that would, in the absence of said spring, cause said moveable portion to rotate about said pivot in said second direction.

11. A method for an individual to mount a vehicle bed extender on a vehicle having an open storage bed having a rear end, a first upstanding side panel to one side of said bed, a second upstanding side panel to an opposite side of said bed and a tailgate, a first mounting station fixed with respect to said first upstanding panel, and a second mounting station fixed with respect to said second upstanding panel, the method comprising:
 providing a generally U-shaped vehicle bed extender, said vehicle bed extender having a first side wall, a second side wall, a connecting wall extending between said first side wall and said second side wall, a first mount with a first interlocking portion secured to said first side wall, and a second mount with a second interlocking portion secured to said second side wall;
 moving a moveable portion of said first mounting station and a moveable portion of said second mounting station such that said moveable portions are in a first position that allows said first mounting station to engage one of said first interlocking portion and said second interlocking portion and allows said second mounting station to engage the other of said first interlocking portion and said second interlocking portion;
 positioning said first side wall and said second side wall between said first side panel and said second side panel, such that said first interlocking portion is positioned above but not engaged by one of said first mounting station and said second mounting station and said second interlocking portion is positioned above but not engaged by the other of said first mounting station and said second mounting station, so that said connecting wall is in substantially vertically aligned over said tailgate rearward of said rear end of said bed and said extender provides access from above to a space between said first side wall and said second side wall;
 moving said bed extender substantially downward without substantially changing said substantial vertical alignment of said connecting wall, such moving causing said first mounting station of said first side panel to engage one of said first interlocking portion and said second interlocking portion, and causing said second mounting station of said second side panel to engage the other of said first interlocking portion and said second interlocking portion, so that said bed extender is in a first mounting position with said connecting wall in a substantially vertical position over said tailgate rearward of said rear end of said bed and said extender provides access from above to a space between said first side wall and said second side wall; and moving said moveable portion of said first mounting station and said moveable portion of said second mounting station such that said moveable portions are in a second position that prevents disengagement of said first mounting station to one of said first interlocking portion and said second interlocking portion and prevents disengagement of said second mounting station from the other of said first interlocking portion and said second interlocking portion.

12. The method of claim 11, further comprising moving said bed extender from said first mounting position to a second mounting position in which said connecting wall is in a substantially vertical position over said rear end of said bed and forward of said tailgate and said extender provides access from above to a space between said first side wall and said second side wall.

13. The method of claim 12, wherein said moving said bed extender from said first mounting position comprises rotating said bed extender about an axis.

14. A vehicle bed extender for use on a vehicle having an open storage bed having a rear end, a first upstanding side panel to one side of said bed, a second upstanding side panel to an opposite side of said bed and a tailgate, a first mounting station fixed with respect to said first upstanding panel, and a second mounting station fixed with respect to said second upstanding panel, said vehicle bed extender comprising:
  a first side wall;
  a second side wall;
  a connecting wall extending between said first side wall and said second side wall;
  a first mount with a first interlocking portion secured to said first side wall; and
  a second mount with a second interlocking portion secured to said second side wall, said vehicle bed extender being configured to be installed by an individual in accordance with a process comprising:
    moving a moveable portion of said first mounting station and a moveable portion of said second mounting station such that said moveable portions are in a first position that allows said first mounting station to engage one of said first interlocking portion and said second interlocking portion and allows said second mounting station to engage the other of said first interlocking portion and said second interlocking portion;
    positioning said first side wall and said second side wall between said first side panel and said second side panel, such that said first interlocking portion is positioned above but not engaged by one of said first mounting station and said second mounting station and said second interlocking portion is positioned above but not engaged by the other of said first mounting station and said second mounting station, so that said connecting wall is in substantially vertically aligned over said tailgate rearward of said rear end of said bed and said extender provides access from above to a space between said first side wall and said second side wall;
    moving said bed extender substantially downward without substantially changing said substantial vertical alignment of said connecting wall, such moving causing said first mounting station of said first side panel to engage one of said first interlocking portion and said second interlocking portion, and causing said second mounting station of said second side panel to engage the other of said first interlocking portion and said second interlocking portion, so that said bed extender is in a first mounting position with said connecting wall in a substantially vertical position over said tailgate rearward of said rear end of said bed and said extender provides access from above to a space between said first side wall and said second side wall; and
    moving said moveable portion of said first mounting station and said moveable portion of said second mounting station such that said moveable portions are in a second position that prevents disengagement of said first mounting station to one of said first interlocking portion and said second interlocking portion and prevents disengagement of said second mounting station from the other of said first interlocking portion and said second interlocking portion.

15. The vehicle bed extender of claim 14, wherein said vehicle bed extender is further configured to be moveable from said first mounting position to a second mounting position in which said connecting wall is in a substantially vertical position over said rear end of said bed and forward of said tailgate and said extender provides access from above to a space between said first side wall and said second side wall.

16. The vehicle bed extender of claim 15, wherein said vehicle bed extender is configured to be moveable from said first mounting position by rotating said bed extender about an axis.

17. The vehicle bed extender of claim 3, wherein when said first moveable portion is moved to its second position and said second moveable portion is moved to its second position said vehicle bed extender is detachable from said vehicle without substantially changing said substantial vertical alignment of said connecting wall.

18. The vehicle bed extender of claim 17, wherein said vehicle bed extender is configured such that detaching said vehicle bed extender from said vehicle without substantially changing said substantial vertical alignment of said connecting wall allows detachment of said vehicle bed extender when cargo is located so as to prevent substantially changing said substantial vertical alignment of said connecting wall.

19. The method of claim 11, wherein said moving said bed extender substantially downward without substantially changing said substantial vertical alignment of said connecting wall allows attachment of said vehicle bed extender when cargo is located so as to prevent substantially changing said substantial vertical alignment of said connecting wall.

20. The vehicle bed extender of claim 14, wherein said moving said bed extender substantially downward without substantially changing said substantial vertical alignment of said connecting wall allows attachment of said vehicle bed extender when cargo is located so as to prevent substantially changing said substantial vertical alignment of said connecting wall.

* * * * *

UNITED STATES PATENT AND TRADEMARK OFFICE
Certificate

Patent No. 7,240,940 B2                                                                   Patented: June 14, 2011

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Masayuki Yamaji, Toyota (JP).

Signed and Sealed this Fourteenth Day of June 2011.

<div style="text-align: right;">
PHILIP S. HYDER<br>
*Supervisory Patent Examiner*<br>
Art Unit 2917<br>
Technology Center 2900
</div>

UNITED STATES PATENT AND TRADEMARK OFFICE
CERTIFICATE OF CORRECTION

| | | |
|---|---|---|
| PATENT NO. | : 7,240,940 B2 | Page 1 of 1 |
| APPLICATION NO. | : 11/105120 | |
| DATED | : July 10, 2007 | |
| INVENTOR(S) | : Horst Leitner | |

It is certified that error appears in the above-identified patent and that said Letters Patent is hereby corrected as shown below:

This certificate supersedes the Certificate of Correction issued June 14, 2011. The certificate is vacated since no Certificate of Correction was granted for this patent number.

The correct inventorship set forth in patent is: Horst Leitner, Laguna Beach, CA (US).

Title Page, Item (75) Inventor should read --Horst Leitner, Laguna Beach, CA (US)--.

Signed and Sealed this
Nineteenth Day of July, 2011

David J. Kappos
*Director of the United States Patent and Trademark Office*